US012489507B2

(12) United States Patent
Ganjalizadeh et al.

(10) Patent No.: US 12,489,507 B2
(45) Date of Patent: Dec. 2, 2025

(54) METHODS AND APPARATUS FOR CONTROLLING ONE OR MORE TRANSMISSION PARAMETERS USED BY A WIRELESS COMMUNICATION NETWORK FOR A POPULATION OF DEVICES COMPRISING A CYBER-PHYSICAL SYSTEM

(71) Applicant: Telefonaktiebolaget LM Ericsson (publ), Stockholm (SE)

(72) Inventors: Milad Ganjalizadeh, Stockholm (SE); Amin Azari, Järfälla (SE); Abdulrahman Alabbasi, Kista (SE); Hossein Shokri Ghadikolaei, Täby (SE); Marina Petrova, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 27 days.

(21) Appl. No.: 18/561,782

(22) PCT Filed: May 27, 2022

(86) PCT No.: PCT/SE2022/050517
§ 371 (c)(1),
(2) Date: Nov. 17, 2023

(87) PCT Pub. No.: WO2022/250604
PCT Pub. Date: Dec. 1, 2022

(65) Prior Publication Data
US 2024/0243796 A1     Jul. 18, 2024

Related U.S. Application Data

(60) Provisional application No. 63/194,290, filed on May 28, 2021.

(51) Int. Cl.
*H04B 7/06* (2006.01)
*H04L 1/00* (2006.01)
*H04W 52/14* (2009.01)

(52) U.S. Cl.
CPC ......... *H04B 7/0689* (2013.01); *H04L 1/0017* (2013.01); *H04W 52/143* (2013.01)

(58) Field of Classification Search
CPC ... H04B 7/0689; H04L 1/0017; H04W 52/143
See application file for complete search history.

(56) References Cited

U.S. PATENT DOCUMENTS

2018/0270679 A1 *   9/2018   Laselva ............... H04W 24/08

FOREIGN PATENT DOCUMENTS

| CN | 111629380 A | 9/2020 |
|---|---|---|
| CN | 112040506 A | 12/2020 |

(Continued)

OTHER PUBLICATIONS

"3GPP TS 38.322 V16.2.0", 3rd Generation Partnership Project; Technical Specification Group Radio Access Network; NR; Radio Link Control (RLC) protocol specification (Release 16), Dec. 2020, 1-33.

(Continued)

*Primary Examiner* — Rahel Guarino
(74) *Attorney, Agent, or Firm* — Murphy, Bilak & Homiller, PLLC

(57) ABSTRACT

This document presents one or more advantageous approaches for Reinforcement Learning (RL) powered management of one or more transmission parameters, such as transmit power and diversity, for maximizing the application-layer reliability and availability of a Cyber-Physical System (CPS) with a minimized level of radio/power resource consumption. Example mathematical models are also disclosed and are useful for transforming high-level (Continued)

"intents" (e.g., KPIs that are applicable to industrial automation and control systems) into low-level orchestration objectives that drive the RL-based control. These objectives are subsequently employed in the definition of an RL-powered "orchestrator," which may comprise an appropriately configured network node or other computing platform associated with the wireless communication network used to provide inter-device communications for a CPS comprising a population of devices. Further, the disclosure details example communication—e.g., observations and corresponding control signaling—between the orchestrator and the environment being managed.

20 Claims, 14 Drawing Sheets

(56) References Cited

FOREIGN PATENT DOCUMENTS

| | | | |
|---|---|---|---|
| WO | 2020064134 | A1 | 4/2020 |
| WO | 2020089851 | A1 | 5/2020 |
| WO | 2020164733 | A1 | 8/2020 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.4.0, Mar. 2021, 142 pages.

"3rd Generation Partnership Project; Technical Specification Group Radio Access Network; Evolved Universal Terrestrial Radio Access (E-UTRA); Physical channels and modulation (Release 16)", 3GPP TS 36.211 V16.5.0, Mar. 2021, 249 pages.

"3rd Generation Partnership Project; Technical Specification Group Radio Access Network; NR; Packet Data Convergence Protocol (PDCP) specification (Release 16)", 3GPP TS 38.323 V16.3.0, Mar. 2021, 40 pages.

"3rd Generation Partnership Project; Technical Specification Group Radio Access Network; NR; Physical channels and modulation (Release 16)", 3GPP TS 38.211 V16.5.0, Mar. 2021, 134 pages.

"3rd Generation Partnership Project; Technical Specification Group Services and System Aspects; Service requirements for cyber-physical control applications in vertical domains; Stage 1 (Release 18)", 3GPP TS 22.104 V18.0.0, Mar. 2021, 78 pages.

"O-RAN Use Cases and Deployment Scenarios", O-Ran Alliance, http://www.the5gexchange.com/lg_landing.asp?piddl_lgid_docid=765766, Feb. 2020, 21 pages.

Anand, Arjun, et al., "Resource Allocation and HARQ Optimization for URLLC Traffic in 5G Wireless Networks", IEEE Journal on Selected Areas in Communications, vol. 36, No. 11, Nov. 2018, 11 pages.

Ayidh, Abdulrahman Al, et al., "Energy-Efficient Power Allocation in URLLC Enabled Wireless Control for Factory Automation Applications", 2020 IEEE 31st Annual International Symposium on Personal, Indoor and Mobile Radio Communications: Track 4: Applications and Business, 2020, 6 pages.

Elsayed, Medhat, et al., "Reinforcement Learning-based Joint Power and Resource Allocation for URLLC in 5G", IEEE, 2019, 6 pages.

Ganjalizadeh, Milad, et al., "An RL-based Joint Diversity and Power Control Optimization for Reliable Factory Automation", 2020 IEEE 31st Annual International Symposium on Personal, Indoor and Mobile Radio Communications, 2020, 7 pages.

Ganjalizadeh, Milad, et al., "Translating Cyber-Physical Control Application Requirements to Network level Parameters", 2020 IEEE 31st Annual International Symposium on Personal, Indoor and Mobile Radio Communications, 2020, 7 pages.

Jang, Hyeondeok, et al., "URLLC Mode Optimal Resource Allocation to Support HARQ in 5G Wireless Networks", IEEE Access, vol. 8, pp. 126797-126804, 2020, 8 pages.

Khalifa, Nesrine Ben, et al., "Low-Complexity Channel Allocation Scheme for URLLC Traffic", IEEE Transactions on Communications, vol. 69, No. 1, Jan. 2021, 13 pages.

Sun, Chengjian, et al., "Unsupervised Deep Learning for Ultra-reliable and Low-latency Communications", 2019 IEEE Global Communications Conference (GLOBECOM), doi: 10.1109/GLOBECOM38437.2019.0913851, 2019, 6 pages.

Zhao, Guofeng, et al., "Joint Power Control and Channel Allocation for Interference Mitigation Based on Reinforcement Learning", IEEE Access, vol. 7, Special Section on Artificial Intelligence for Physical-Layer Wireless Communications, 2019, pp. 177254-177265.

Ganjalizadeh, et al., "An RL-based Joint Diversity and Power Control Optimization for Reliable Factory Automation", 2021 IEEE Global Communications Conference (GLOBECOM), 2021, 1-6.

Savaglio, et al., "Lightweight Reinforcement Learning for Energy Efficient Communications in Wireless Sensor Networks", IEEE Access, vol. 7, Mar. 18, 2019, 29355-29364.

Yang, et al., "Deep Reinforcement Learning Based Massive Access Management for Ultra-Reliable Low-Latency Communications", IEEE Transactions on Wireless Communications, vol. 20, No. 5, Dec. 17, 2020, 1-13.

* cited by examiner

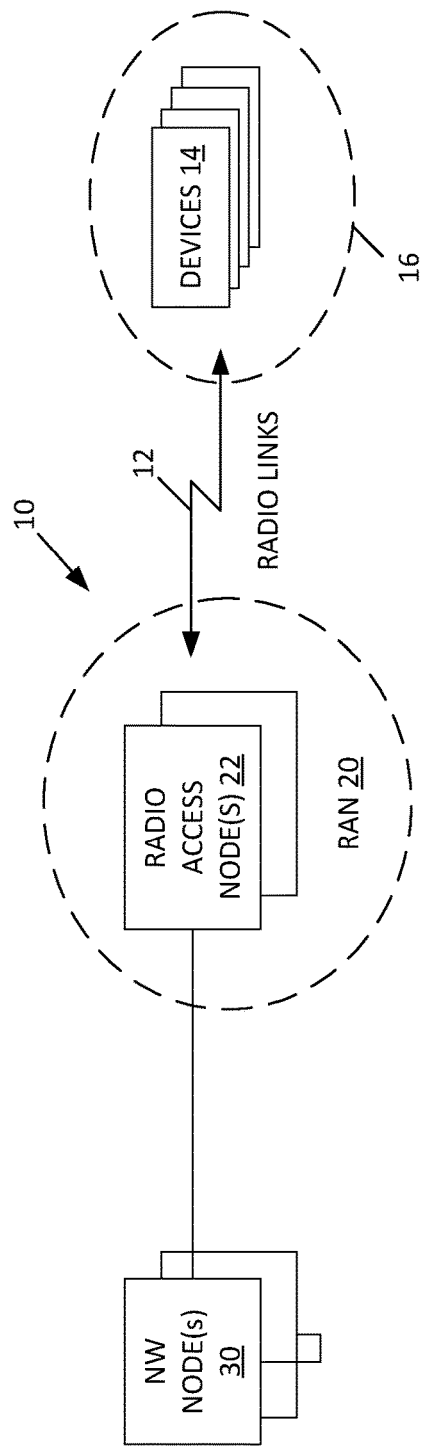
FIGURE 9
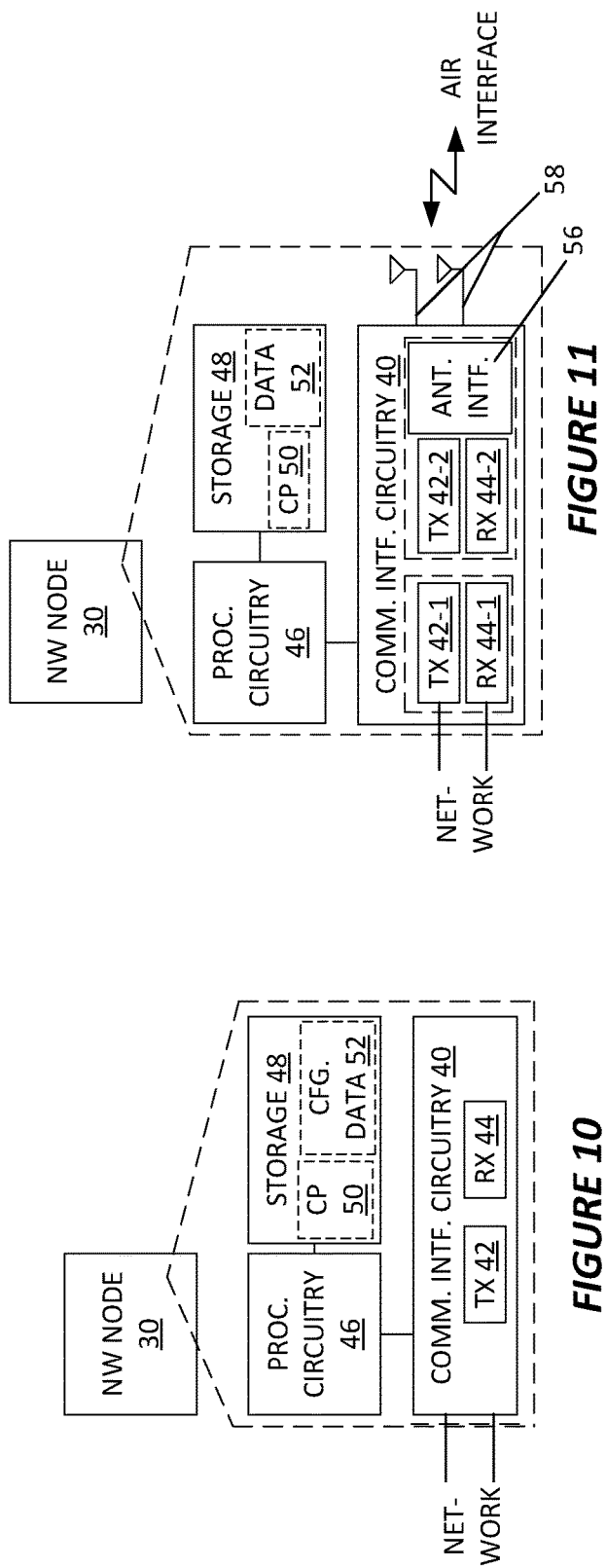
FIGURE 10
FIGURE 11

METHODS AND APPARATUS FOR CONTROLLING ONE OR MORE TRANSMISSION PARAMETERS USED BY A WIRELESS COMMUNICATION NETWORK FOR A POPULATION OF DEVICES COMPRISING A CYBER-PHYSICAL SYSTEM

TECHNICAL FIELD

Methods and apparatus embody techniques for controlling transmission parameters used for transmitting on wireless links of a wireless communication network that communicatively connect devices operating as a cyber-physical system.

BACKGROUND

Cyber-physical systems (CPSs) are engineered systems in which computation and communication are integrated with physical processes. Within CPSs, the continuous interactions with the physical world put strict reliability requirements for the underlying communication system. The reliability requirements for cyber-physical control applications are defined in the Third Generation Partnership Project (3GPP) Technical Specification (TS) 22.104 v18.0.0. Failing to fulfil such demands may result in faulty behaviors, cause economic losses, or even endanger human lives.

The Fifth Generation (5G) of wireless networks specified by the 3GPP is designed to satisfy the stringent requirements applicable to CPS communications via Ultra Reliable Low Latency Communication (URLLC). However, electromagnetic interference, physical vibration, and the presence of metallic objects in the typical CPS environment all complicate the support of real-time control via wireless communication. Diversity transmission techniques and transmit power control are powerful tools for reducing latency and enhancing reliability in the context of wireless communications but controlling such parameters in the context of CPSs relying on multiple wireless links for inter-device signaling presents complex challenges.

3GPP proposes various transmission diversity techniques, where "diversity" has broad meaning, such as diversity in time or diversity in frequency or coding. A first technique is Hybrid Automatic Repeat reQuest (HARQ) retransmissions on the medium access control (MAC) layer, which may exploit both time and frequency diversity. See 3GPP TS 36.321 v16.40.0. Transmission repetitions on the physical (PHY) layer is another type of transmission diversity, with repetition techniques leveraging time and/or frequency diversity. See 3GPP TS 36.211 v16.5.0. Packet duplication on the packet data convergence protocol (PDCP) layer is another diversity technique. Example packet-duplication approaches use either multi-connectivity to leverage spatial diversity or carrier aggregation to benefit from frequency diversity. See 3GPP TS 38.323 v16.3.0. Automatic Repeat request (ARQ) retransmissions on the radio link control (RLC) layer is another transmission diversity technique and it may exploit time and frequency diversity. See 3GPP TS 38.322 v16.2.0.

Issues with the various diversity techniques include the "costs" of excessive resource usage and energy consumption to transmit the same amount of information. Such costs are in tension with the desire for low-cost, energy efficient deployments, such as are favored in wireless-based industrial control or manufacturing. For example, inefficient (radio) resource usage or increased power consumption may become acute problems as the number of connected devices increases. Consider, for example, large fleets of wirelessly-connected robotic devices.

Moreover, enabling diversity techniques for all devices in a given population of devices using full power transmission does not necessarily improve reliability KPIs. For example, enabling diversity techniques for a population of devices comprising a CPS might increase the load on the involved wireless communication network, resulting in longer multi-user scheduling delays and unnecessary utilization of network resources (including intra-network transport resources and "air interface" resources, such as physical resource blocks (PRBs) allocable for transmission. Further, full-power transmissions increase the interference to other users. For example, a User Equipment (UE) transmitting at full power in one network "cell" may interfere with UEs in neighboring cells. On the other hand, transmission power reductions force the involved radio access nodes of the Radio Access Network (RAN)—e.g., "gNodeBs" in a 5G RAN—to use lower coding rates to meet the applicable target block error rates. Coding-rate reductions increase the amount of time-frequency resource blocks—physical resource blocks or PRBs—needed for a given transmission.

There are two common solutions for the dynamic control of downlink (DL) transmission power and (transmit) diversity technique configuration. A first family of solutions are "model-driven" approaches that rely on one or more models of the wireless networks or systems at issue. One proposal is to use a joint resource allocation and Hybrid Automatic Repeat reQuest (HARQ) optimization framework to minimize the required bandwidth in single-cell scenarios, subject to packet error ratio. See A. Anand and G. De Veciana, "Resource allocation and HARQ optimization for URLLC traffic in 5G wireless networks," IEEE J. Sel. Areas Commun., vol. 36, no. 11, pp. 2411-2421 November 2018, and see H. Jang, J. Kim, W. Yoo, and J. M. Chung, "URLLC Mode Optimal Resource Allocation to Support HARQ in 5G Wireless Networks," IEEE Access, vol. 8, pp. 126797-126804, 2020.

"Data-driven" approaches constitute another family of solutions. One proposal in this family is based on a risk-sensitive reinforcement learning (RL) to dynamically orchestrate transmission repetitions in frequency in order to reduce the packet error ratio. See N. Ben Khalifa, V. Angilella, M. Assaad, and M. Debbah, "Low-Complexity Channel Allocation Scheme for URLLC Traffic," IEEE Trans. Commun., vol. 69, no. 1, pp. 194-206, January 2021. Other approaches are based on Reinforcement-Learning (RL) based power and resource allocation control schemes, for transmission power and scheduling. See Y. Haibin, "Dynamic resource allocation method for high-concurrency multi-service industrial 5G network," CN202010385842.9A, 2020, and M. Elsayed and M. Erol-Kantarci, "Reinforcement learning-based joint power and resource allocation for URLLC in 5G," in 2019 IEEE Global Communications Conference, GLOBECOM 2019—Proceedings, 2019.

However, as noted above, there currently exist numerous challenge(s) in controlling or managing the wireless links used for interconnecting some or all of the devices comprised in a CPS. For example, existing model-driven solutions rely on non-realistic model assumptions, such as strict assumptions on queue models (e.g., M/GI/∞ with zero queuing delay in 3GP TS 38.323 v16.3.0 and M/G/1 in 3GPP TS 38.322 v16.2.0). Such assumptions often are not realistic in the CPS context, and lead to inefficient system design or lower reliability than expected.

Proposed RL solutions may have limited practicality and thus present corresponding challenges with respect to implementation and effectiveness. To solve the problem of unrealistic model assumption, the use of data-driven (model-free) RL has been proposed in recent works. However, most of the works addressing URLLC problems using RL assume a per-slot orchestration, where "slot" denotes a schedulable transmission time. This short period implies that the entire pipeline (including data transmission, processing, decision making, and application of the control decision) should occur within a time as short as one slot, which could be as small as 62.5 nanoseconds. See 3GPP TS 38.211 v16.5.0. Such real-time interactions for service management and orchestration have limited feasibility, at least in the near future, with example deployment scenarios seen in O-RAN Alliance, "O-RAN Use Cases and Deployment Scenarios." 2020.

Resource inefficiency and cost inefficiency stand as key issues in the context of using a Public Land Mobile Network (PLMN) or other wireless communication network for interlinking devices of a CPS. For example, while 3GPP solutions provide for some management of network resources to improve the Key Performance Indicators (KPIs) applicable to URLLC traffic, they do so without consideration of system energy consumption. Lack of intent-based orchestration is another issue, with known approaches to managing wireless connections in the URLLC context failing to address lower layer orchestration techniques with respect to application-layer metrics—"intent"—that is related to industrial automation. Still further, the lack of real-world blockage models is yet another issue. Existing RL based orchestration lacks realistic blockage models for key operational or deployment scenarios, such as the deployment of wirelessly linked systems in a factory environment.

SUMMARY

Certain aspects of this disclosure and embodiments described herein may provide solutions to the above-noted challenges or other challenges. Among other things, this document presents one or more advantageous approaches for Reinforcement Learning (RL) powered management of one or more transmission parameters, such as transmit power and diversity, for maximizing the application-layer reliability and availability of a Cyber-Physical System (CPS) with a minimized level of radio/power resource consumption. Example mathematical models are also disclosed and are useful for transforming high-level "intents" (e.g., Key Performance Indicators or KPIs that are applicable to industrial automation and control systems) into low-level orchestration objectives that drive the RL-based control. These objectives are subsequently employed in the definition of an RL-powered "orchestrator," which may comprise an appropriately configured network node or other computing platform associated with the wireless communication network used to provide inter-device communications for a CPS comprising a population of devices. Further, the disclosure details example communication—e.g., observations and corresponding control signaling—between the orchestrator and the environment being managed.

In an example embodiment, one or more nodes are configured for operation with respect to a wireless communication network that provides wireless links for interconnecting devices among a population of devices collectively comprising a cyber-physical system. The one or more nodes include communication interface circuitry and processing circuitry. The processing circuitry is configured to perform control operations in each control cycle in a continuing succession of control cycles and, particularly, is configured to obtain estimates of application-layer availability and reliability for respective devices among the population of devices. Here, each device executes one or more respective applications that run in dependence on cyber-physical system communications exchanged over a respective wireless link provided by the wireless communication network. Correspondingly, the estimates of application-layer availability and reliability depend on channel conditions of the respective wireless links and loading conditions in the wireless communication network, bearing on delivery of the cyber-physical system communications.

The processing circuitry of the one or more nodes is further configured to determine a set of control decisions via a learned reward function that takes the estimates of application-layer availability and reliability as inputs and is trained to determine the set of control decisions as transmit power and transmit diversity settings for transmitting on the respective wireless links, for maximization of application-layer availability and reliability in the cyber-physical system, subject to transmit power and bandwidth allocations of the wireless communication network for supporting the cyber-physical system. Still further, the processing circuitry is configured to send, via the communication interface circuitry, signaling indicating the transmit power and transmit diversity settings.

Another embodiment comprises a method performed by a network node of a wireless communication network. The method includes, in each control cycle in a continuing succession of control cycles, performing control operations. Such operations include: (a) obtaining estimates of application-layer availability and reliability for respective devices among a population of devices collectively operating as a cyber-physical system, each device executing one or more respective applications that run in dependence on cyber-physical system communications exchanged over a respective wireless link provided by the wireless communication network, such that the estimates of application-layer availability and reliability depend on channel conditions of the respective wireless links and loading conditions in the wireless communication network, bearing on delivery of the cyber-physical system communications; (b) determining a set of control decisions via a learned reward function that takes the estimates of application-layer availability and reliability as inputs and is trained to determine the set of control decisions as transmit power and transmit diversity settings for transmitting on the respective wireless links, for maximization of application-layer availability and reliability in the cyber-physical system, subject to transmit power and bandwidth allocations of the wireless communication network for supporting the cyber-physical system; and (c) sending signaling indicating the transmit power and transmit diversity settings.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 9 is a block diagram of a wireless communication network, according to an example embodiment.

FIG. 10 is a block diagram of a network node, according to an example embodiment.

FIG. 11 is a block diagram of a network node, according to another example embodiment.

DETAILED DESCRIPTION

Figure 1:
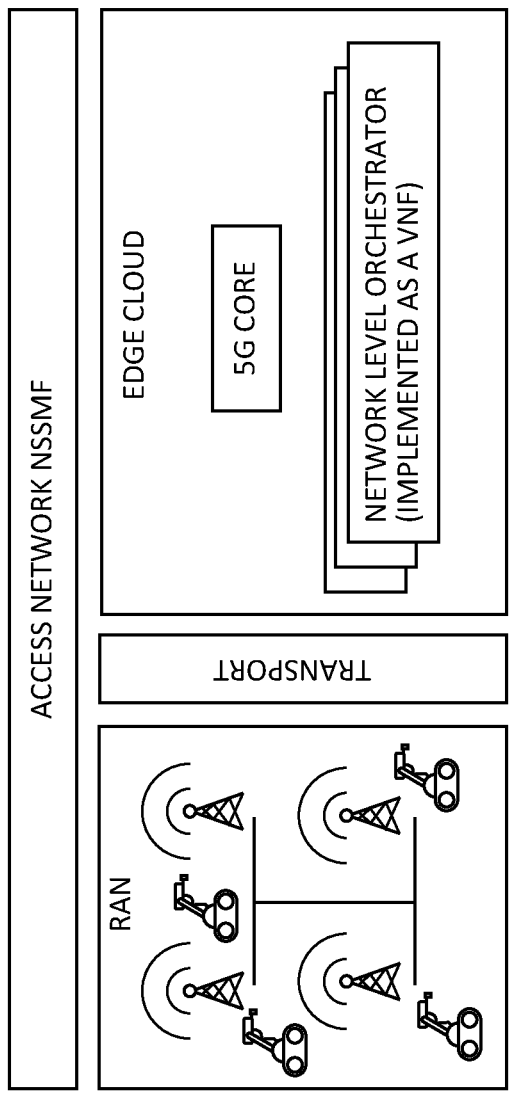
FIG. 1 is a block diagram illustrating an example architectural embodiment of a wireless communication network, which includes network level orchestration of wireless links for communicatively coupling devices of a cyber-physical system.

In an example embodiment, there are two Reinforcement Learning (RL) "agents" used, a first RL agent referred to as "RLP" to denote a "Reinforcement Learning Planner" function, and a second RL agent referred to as "RLO" to denote a "Reinforcement Learning Orchestrator" function. Such functions are implemented on one or more computing platforms, which may or may not be virtualized computing environments, and may be distributed in or across multiple physical servers or other network nodes in or associated with the involved wireless communication network. As used herein, such computing platform(s) are referred to as node(s). The node(s) may be dedicated to the RLP and RLO operations, or such operations may be part of the overall functionality of the node.

Further disclosed details include example communications, and the bidirectional "translation" of high-level industrial intents—e.g., goals expressed as Key Performance Indicators or KPIs—and physical-layer observations (collected operational statistics or other data) for forming the reward function used to determine control decisions. Such details together provide an "intent-driven" and closed-loop orchestration of a cyber-physical system. Here, a cyber-physical system is a population or collection of devices working together to provide overall functionality, such as a factory control or industrial automation system. Each device in the population runs (executes) one or more respective applications according to which the device provides its constituent functionality in the overall system.

In the context of the RLO and RLP operations and associated techniques, devices in a cyber-physical system rely on wireless links provided by a wireless communication network, such as a Fifth Generation (5G) network operating according to Third Generation Partnership Project (3GPP) specifications. In other words, the inter-device messaging or signaling by which data and control information flows among or between respective devices in the cyber-physical system is carried over wireless links provided by the wireless communication network. As such, the devices embed or are associated with radio modems or other wireless communication equipment, e.g., User Equipments or UEs, that are configured for wirelessly attaching to the wireless communication network according to the air interface and Radio Access Technology (RAT) used by the network.

Certain embodiments may provide one or more of the following technical advantages. Once deployed, the RLO interacts with the environment and manages radio resources and power consumption. During its runtime operation, the RLO aims at enforcing reliability-preserving policies while minimizing resource/energy consumption. In comparison with the technique(s) disclosed herein, achieving comparable levels of reliability/availability using existing approaches comes at a much higher cost and carbon footprint. Correspondingly, the disclosed techniques can be understood as enabling "green" (environmentally-friendly) implementations of Ultra Reliable Low Latency Communication (URLLC), where URLLC has increasing importance in a vast array of operational scenarios.

Furthermore, disclosed technique(s) provide for near real-time control (e.g., a control-loop cycle on the order of 500 msec), which is compatible with current developments of edge computing for cellular networks. See the 2020 paper by the O-RAN Alliance entitled "O-RAN Use Cases and Deployment Scenarios.". FIG. 1 depicts an example architectural embodiment for implementation of the disclosed technique(s), where "NSSMF" refers to a Network Slice Selection Management Function that manages network "slices," which are virtualized networks realized using the underlying physical and processing resources of the network, and wherein different communication services or operations may be supported in respective slices.

In FIG. 1, the Radio Access Network (RAN) provides communicative coupling to and between devices or systems that comprise or integrate UEs and correspondingly rely on the wireless communication links established using such UEs to carry out their intended operations, e.g., such as factory automation or industrial process control functions. Such operations will be understood as having high-level KPIs (performance requirements) and the "Network Level Orchestrator" illustrated in FIG. 1 carries out ongoing near real time or non-real time control of one or more radio parameters for the wireless communications carried out by the devices of the cyber-physical system, based on the advantageous RL-based control techniques disclosed herein. Unless noted, reference to the "devices" or any particular "device" of a cyber-physical system assumes that the device(s) are communicatively linked via respective wireless links of a wireless communication network, such as the one shown in FIG. 1. The orchestrator may be implemented as a Virtual Network Function (VNF), meaning that its operational logic and processing is carried out using virtualized computing and memory resources instantiated on host computing platform, all of which may be considered as a "node."

Such near/non real-time control—hereafter, simply "control" unless otherwise qualified—provides closed-loop management of the radio parameters based on collecting observations, processing the observations, and determining control actions from the processing. The proposed RL controller cycle period harmonizes with goals regarding Open RAN (O-RAN) standardization of the "A1" interface between non- and near-real-time RAN Intelligent Controllers (RICs).

Further, as noted above, the disclosed technique(s) take application-layer reliability KPIs into consideration when making control decisions for the lower layers—e.g., radio control or configuration decisions, such as retransmission and power control decisions for one or more devices among the population of devices comprised in a cyber-physical system supported by wireless links of the wireless communication network. Such control may be exercised with respect to each of one or more defined populations of devices belonging to one or more factory-control or industrial-automation systems, or other associated groups of devices carrying out operations supported by URLLC provided via the wireless communication network.

Some of the embodiments contemplated herein will now be described more fully with reference to the accompanying drawings. Embodiments are provided by way of example to convey the scope of the subject matter to those skilled in the art.

The term "packet loss" herein refers to an event in which a protocol data unit (PDU) is not successfully delivered within a specified deadline to the target PDU layer (e.g., User Plane Function or UPF). Further, for discussion purposes herein, the terms and definitions given in 3GPP TR 22.104 v18.0.0 and the following definitions/terminology applies.

First, the term "Survival time" is denoted as $T_{sv}$ and it refers to the time that an application consuming a communication service may continue without an anticipated message. Here, the application in question may be executing on an entity that is communicatively coupled to a wireless communication network, and wherein the anticipated message is delivered via the wireless communication link. "Entity" denotes any given device or system executing the application in question and there may be an overall population of such entities, e.g., cooperatively interacting in terms of sensing, processing, and controlling, for example in an industrial automation or manufacturing environment. Any such entity may also be referred to herein as a User Equipment or UE, both to denote the fact that the entity is a user of communication services provided by the involved wireless communication network rather than, per se, a fixed part of the network infrastructure, and to denote the fact that the entity comprises or incorporates the communication transceivers, protocol processors, and any credential management needed to access and use the wireless communication network via the provided air interface(s), which may rely on one or more than one Radio Access Technology (RAT).

For periodic traffic, with cycle time $T_c$, the survival time can be expressed as the maximum number of lost packets (denoted here as $N_{sv}$, where $$N_{sv} = \left\lfloor \frac{T_{sv}}{T_c} \right\rfloor)$$

that the application can tolerate without failure.

Another term of interest is "Application layer availability," which is denoted as ($a_{ij}$) and refers to the percentage value of the amount of time the end-to-end communication service is delivered according to an agreed Quality of Service (QoS), as observed by the application layer, divided by the amount of time the "system" is expected to deliver the end-to-end service according to the specification in a specific area. Note that the application can tolerate consecutive packet loss with the duration of $T_{sv}$, and still, be available.

Application layer reliability ($r_{ij}$) is another term of interest and it refers to the ability of the communication service to perform as required for application layer for a given time interval, under given conditions. Mean time between failures is one of the typical indicators of reliability. This parameter states the mean value of how long the application is available before it becomes unavailable. Note that a failure in application happens after consecutive packet loss which is longer than survival time, $T_{sv}$.

For modeling purposes, a working definition of the application state variable for $u_{ij}$ as below $$Z_{ij}(t) = \begin{cases} 0, & \text{if application is in failed state} \\ 1, & \text{otherwise} \end{cases}$$

Then, the application layer availability for $u_{ij}$ can be derived as $$a_{ij} := \lim_{t \to \infty} Pr\{Z_{ij}(t) = 1\} = \lim_{T \to \infty} \frac{1}{T} \int_{t=0}^{T} Z_{ij}(t) dt. \quad (1)$$

The application layer reliability for $u_{ij}$ can be derived as $$r_{ij} := \lim_{T \to \infty} \frac{1}{N(T)} \int_{t=0}^{T} Z_{ij}(t) dt. \quad (2)$$

where N(T) denote the number of times the crossing from $Z_{ij}(t)=1$ to $Z_{ij}(t)=0$ occurs.

With the foregoing term definitions in mind, consider an example embodiment based on two RL agents: an "RLP" comprising an RL-powered planner, and an "RLO" comprising an RL-powered orchestrator, where "orchestrator" and "controller" are interchangeable terms.

Figure 2:
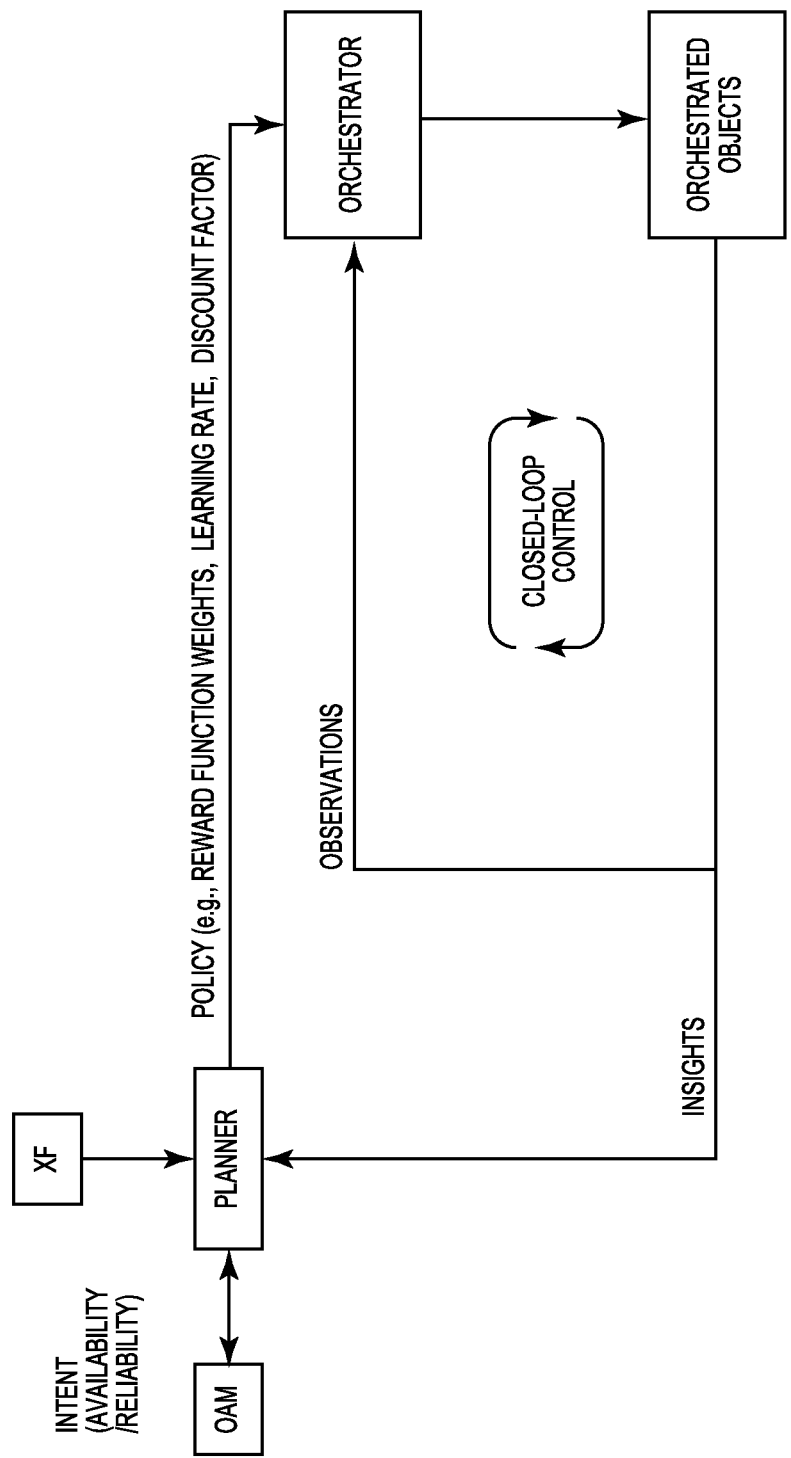
FIG. 2 is a block diagram illustrating an overall architecture and corresponding interconnections for a Reinforcement Learning Planner (RLP) and a Reinforcement Learning Orchestrator (RLO), according to an example embodiment.

FIG. 2 depicts the overall architecture and corresponding interconnections, for an example embodiment. In the depicted arrangement, the RLP is responsible for interactions with application/network function (denoted as XF) and operation and management (OAM). The former provides the application layer reliability KPIs to the RLP and receives reports and status of the radio access network. On the other hand, OAM receives requests for resource allocation (in terms of power or bandwidth) from the RLP and allocates resources to a URLLC "slice" of the involved wireless communication network, based on such requests and the status of other network slices. The orchestrated objects are the industrial devices controlled by the RL. Here, an "industrial device" is a device or system whose runtime operation depends on wireless communications provided via the involved wireless communication network—i.e., the wireless communication network providing the URLLC slice. As previously noted, a network "slice" may be understood as a virtualized network operated on an underlying network infrastructure, for supporting specific applications or application types, specific groups of users, etc.

In operation, the RLP provides policy optimization via "hyper-parameter" tuning, which includes, for example, tuning reward function weights, the learning rate of the reinforcement learning, and adjusting a discount factor. Correspondingly, the RLO orchestrates transmit power control and transmit-diversity settings or configurations for one or more orchestrated objects, e.g., a population of UEs managed on a URLLC slice of the involved wireless communication network.

Figure 3:
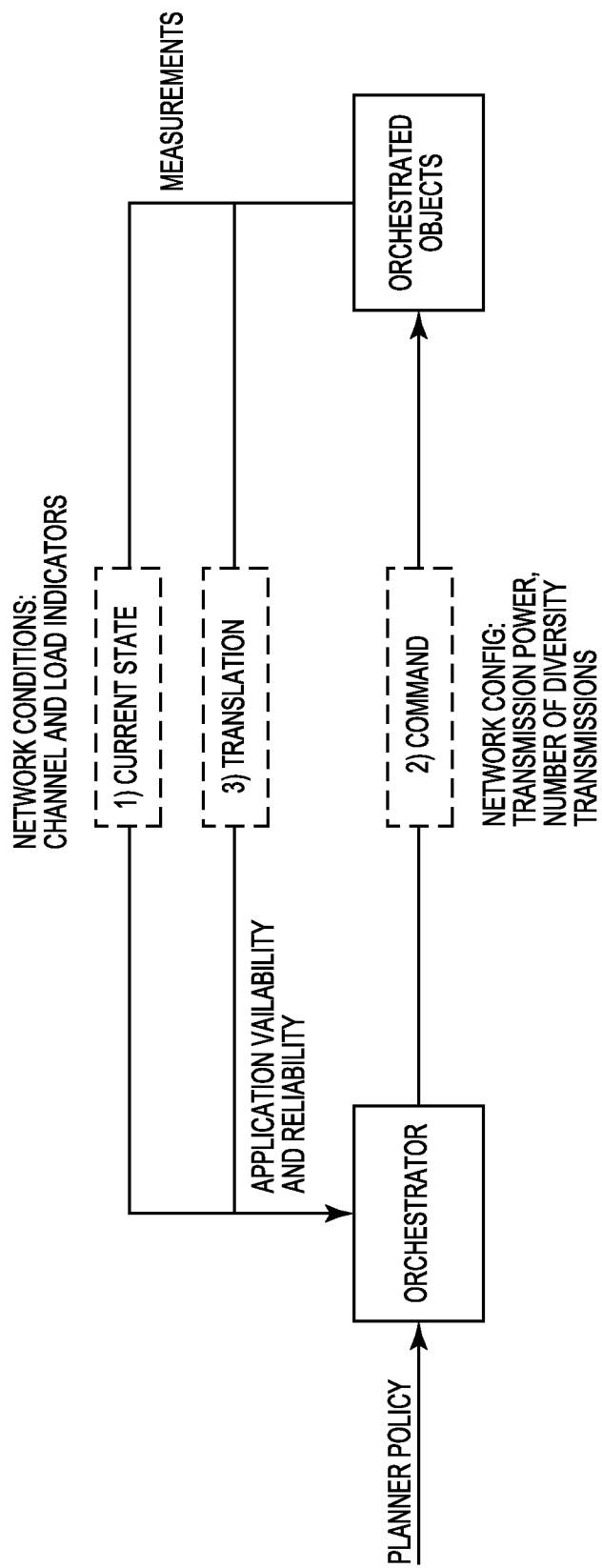
FIGS. 3 and 4 are block diagrams illustrating example details for the RLO introduced in FIG. 2.

FIG. 3 provides example details for the RLO. As the figure shows, in the first step, the RLO receives the "state" of each orchestrated object (UE, aka, device) using measurements representing its channel condition and the load condition (between the device and the radio access node in the wireless communication network supporting it). The former is a function of various parameters, such as interference caused by other devices and the coding rate of the transmission to the device. The load condition is reflective of the wireless communication network, or at least the parts of it that bear on providing the involved communication service, and depends on the traffic arrival, queuing mechanisms, packet sizes, coding rates, and the diversity-transmission settings.

In the second step, the RLO configures the transmission power and the number of diversity transmissions (via any arbitrary technique) using command messages. In the next step period, the RLO receives feedback that depends on its most recent control decisions regarding transmit power and transmit diversity. The feedback is based on measurements from or related to operation of the devices and is provided via a translation entity that translates such measurements into estimations of application layer reliability for the respective devices. Use of RL in the RLO for decision-making involves two phases: exploration, which involves learning optimal control policies, and exploitation, which involves applying the optimal control policies in the control loop executed by the RLO. Exploiting or applying the optimal control policy/policies (i.e., sending the command messages) is done via any arbitrary policy with such randomness that can provide sufficient exploration. However, in the exploitation phase, the RLO must use the learned policy.

Figure 4:
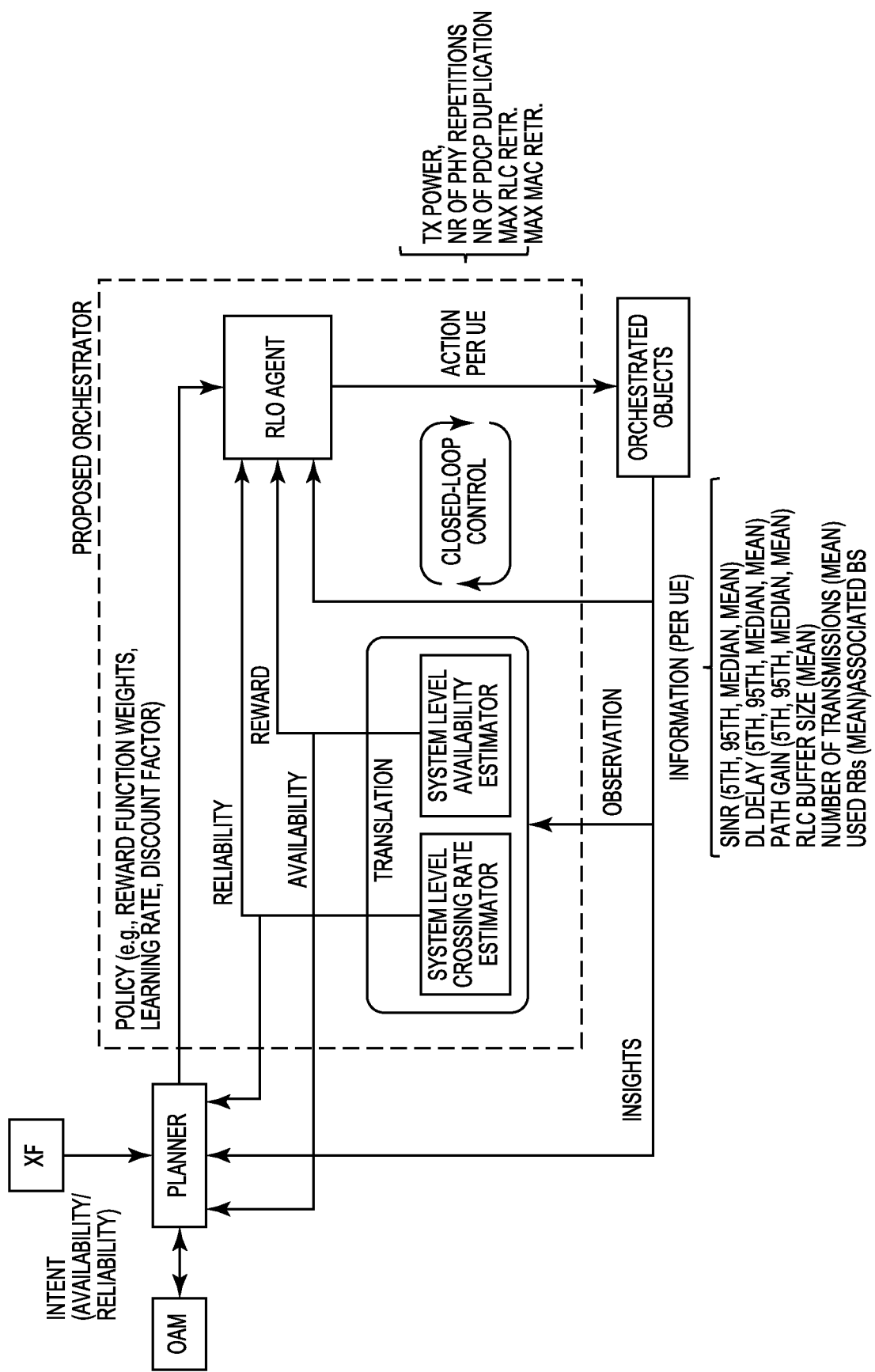

FIG. 4 illustrates further example details for the RLO. One object of the RLO is to maximize system-level availability and reliability by setting the transmission power and diversity techniques given a specific maximum transmission power and bandwidth allocated to the URLLC slice. That is, in an example scenario, a network slice supports a population of devices comprising a cyber-physical system, such that the overall resource allocations of the network slice, e.g., in terms of power and bandwidth, can be understood as being shared among the respective devices, which means that managing the transmission parameters used for transmitting on the respective wireless links that interconnect respective devices in the population is subject to the overall resource allocations of the network slice.

Orchestration involves interaction between the RLO and a translation entity, also referred to as a translation function. The observations collected from or determined for orchestrated objects drive decision-making by the RLO. Particularly, the translator may derive feedback for the RLO to use for decision-making in the current or next control-loop cycle of the RLO. As a particular example, the observations related to application layer reliability KPIs (i.e., estimation of device availability and crossing rate) are sent to the translation entity in which long-term availability and reliability are derived, and the derived long-term availability and reliability are provided as control feedback to the RLO. The RLO uses the availability and reliability determinations, along with weights from the RLP, for calculating a reward function that determines its next set of control decisions—i.e., the updated transmit power and diversity settings to be used by or for the orchestrated devices. Note that the "information per UE" comment in the text of FIG. 4 may be understood as referring to example information obtained or generated for each device of a cyber-physical system that is communicatively interlinked within the cyber-physical system by a respective wireless link provided by the wireless communication network. And, as evident from its usage, the term "orchestrated device" merely emphasizes that the device in question has a wireless link for which transmission parameter(s) are managed jointly via the RLO operations described herein.

Example feedback provided to the RLO by the translator includes estimation of device availability and estimation of device crossing rate (which can be understood as an estimate or measure of reliability). Here, "availability" and "reliability" comport with the earlier definitions of those terms. The translator may be integrated with the RLO or may be implemented separate from the RLO, and it derives the feedback provided to the RLO using observations collected from or for the orchestrated devices. Example observations include statistics from individual ones of the devices, which include, for example, but are not limited to: (i) statistics of received SINR (e.g., 5th percentile, 95th percentile, median, mean), (ii) downlink (DL) delay statistics (e.g., 5th percentile, 95th percentile, median, mean), (iii) path gain statistics (e.g., 5th percentile, 95th percentile, median, mean), (iv) Radio Link Control (RLC) buffer status, (v) the mean number of transmissions (first and diversity instances), (vi) mean number of used resource blocks per slot, and, finally, (vii) the associated radio access node (e.g., gNB or other base station) through which the device is connected to the wireless communication network.

Upon receiving the observations, the translator translates the observations into feedback for the RLO, and the RLO makes corresponding control decisions and sends signaling indicating or configuring the decided control actions. Example control actions taken or initiated by the RLO include, but not are limited to (i) the transmission power of resource blocks allocated to specific devices (or alternatively, a weight which specifies the power of resource blocks allocated to a specific user), (ii) the number of PHY layer repetitions of transport blocks transmitted to a specific user, (iii) the number of PDCP layer duplications of PDCP PDUs transmitted to a specific user, (iv) the maximum number of RLC layer retransmissions (also known as ARQ retransmissions), and (v) the maximum number of MAC layer retransmissions (also known as HARQ retransmissions).

Figure 5:
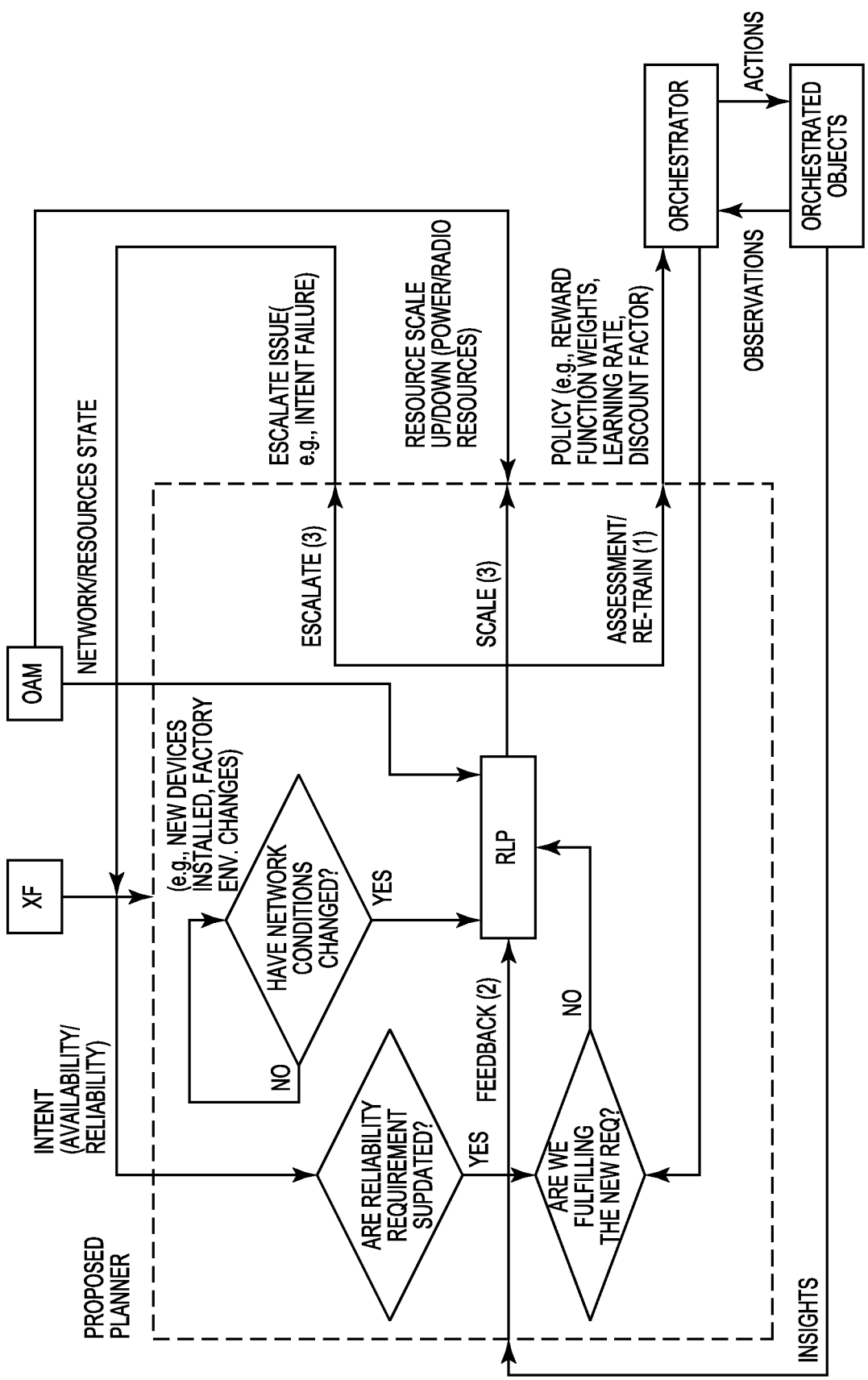
FIG. 5 is a block diagram illustrating example details for the RLP introduced in FIG. 2.

FIG. 5 depicts the RLP according to an example embodiment. The RLP is responsible for managing/requesting resources allocated to URLLC slice used to support the orchestrated devices and is further responsible for intent handling and policy tuning for the RLO. The state of the RLP depends on network conditions (e.g., number of devices using the wireless communication network or at least relevant portions of the network), the current status of the RLO (e.g., whether the availability/reliability KPIs are fulfilled), and insight from the observations collected from or for the devices. Note that the "cycle time" of the RLP is much higher than that of the RLO, implying that there is much more time to gather statistics from the devices in the orchestrated population.

There are at least three sets of actions that the RLP performs in one or more embodiments. One set of actions is assessment/re-training, where the RLP performs training to optimize diversity and power control jointly to maximize reliability KPIs based on currently allocated resources (in terms of power or bandwidth) and present policy (for reward function weights, learning rate, and discount factor). Optimizing diversity and power control means optimizing the transmit-diversity and transmit-power settings for all of the wireless links of the network that are orchestrated in support of a cyber-physical system.

Another set of actions performed by the RLP is resource scaling, which involves scaling up or down the resources allocated for the orchestrated devices. For example, the RLP may request more or less allocated bandwidth or power from an Operations & Maintenance (OAM) node of the wireless communication network, for supporting a URLLC slice used by the orchestrated devices.

Finally, "escalation" represents another set of actions performed by the RLP in one or more embodiments. Particularly, upon the RLP concluding that end-to-end fault handling is required, it sends an escalation message, e.g., an entity in or outside of the wireless communication network that handles or at least initiates handling of performance and operational problems of the involved cyber-physical system.

In an example "orchestration problem," consider a cyber-physical system in which the devices are responsible for performing various functions that facilitate automated production. The communication system—the involved or supporting wireless communication network—is responsible for the timely delivery of sensor data from sensors to the controllers or actuators that perform control actions or carry out emergency procedures responsive to the sensor data. The sensor data and/or the corresponding actuator output signaling flows over wireless links provided by the wireless communication network, and the operations and functionality of the cyber-physical system can be understood as application-layer functionality provided by the application(s) executing on the devices comprised in the cyber-physical system.

An example focus is on downlink (DL) transmissions in a 5G deployment environment with several gNBs configured with multi-cell settings. Here, the index i to denotes a cell of the wireless communication network and the index j denote a user. Here, "user" is a convenient term of reference for any one of the devices in the cyber-physical system that is being managed (orchestrated). The term "cell" refers, for example, to the use of particular communication resources, time, frequency, or spatial, or some mix thereof, to provide radio coverage in a particular physical area or location. Cells may be statically defined, e.g., based on fixed antenna/coverage arrangements and may be subdivided into sectors, etc. Alternatively, cells may dynamic, and coverage may be based on transmit and/or receive beamforming.

Consider a set of cells $\mathcal{C}:=\{C_1, C_2, \ldots, CL_{|\mathcal{C}|}\}$ in the wireless communication network. Each cell $CL_i$ serves a set of devices $\mathcal{U}:=\{1, 2, 3, \ldots, K_i\}$ is the total number of devices served by $CL_i$. K denotes the total number of users by all the cells. The example RLO may use both transmit diversity control and transmit power control to enhance the reliability of the CPS. Let $N_f$ be the number of diversity techniques available for control. Examples of diversity techniques include HARQ retransmissions and packet duplication at PDCP layer. The diversity setting for $u_{ij}$ (i.e., user j associated to $CL_i$) may be expressed as $$f_{ij} = \left( f_{ij}^{(1)}, f_{ij}^{(2)}, \ldots, f_{ij}^{(N_f)} \right)$$

where $f_{ij}^{(k)}$ is the setting for a diversity technique, and hence it is an integer with a maximum number that a system expert sets. For example, if the RLO only can control HARQ retransmissions for $u_{ij}$ and the maximum transmission diversity is set to 10, then $f_{ij}=(f_{ij}^{(1)})$ only contains one diversity technique (i.e., $N_f=1$), and $N_1$ is 10. For power control, the variable $p_{ij}$ may be used to represent the transmission power level to $u_{ij}$, and may represent a quantized power level.

The orchestrated environment is described by a set of states, and the interactions of the RLP/RLO with the environment is through actions and rewards. In more detail, the state space describes the environment where the RLP learns based on sequences of action-reward pairs. The state at time slot t, denoted by S(t), includes application layer QoS and network layer QoS variables as described below.

Translation of Application layer QoS: From Equations (1) and (2) presented earlier herein, application layer availability and reliability are measured in infinite time while the temporal granularity of the RL is defined by a step period, $\Delta t$. Hence, the RLP/RLO use estimations of availability and reliability. Although the estimation of these long-term measures in a short step period might be noisy, such approximation reflects the impact of each action taken by the RLO on application layer QoS in the short-term future. The availability estimator can be defined as $$\overline{a}_{ij}(\Delta t) := \lim_{T \to \infty} \frac{1}{\Delta t} \int_{\Delta t} Z_{ij}(t) dt \qquad (3)$$

However, the reliability unit is time and cannot be reliably estimated via small time intervals. Hence, one may define crossing rate from $Z_{ij}(t)=1$ to $Z_{ij}(t)=0$ as:

$$l_{ij} := \lim_{T \to \infty} \frac{N(T)}{T} \qquad (4)$$

where $l_{ij}$ can be estimated at each step period by $$\overline{l}_{ij}(\Delta t) := \frac{N(\Delta t)}{\Delta t}. \qquad (5)$$

Dividing (1) by (4), then gives $$r_{ij} = \frac{a_{ij}}{l_{ij}},$$

Hence, instead of long term availability and reliability (in (1) and (2), respectively), it is proposed to use estimators of availability and crossing rate (in (3) and (5), respectively).

Network layer QoS variables are, for example, (i) SINR, (ii) path gain, (iii) end-to-end delay, (iv) radio link control (RLC) buffer status, (v) the number of diversity transmissions, and (vi) the number of used resource blocks as the most relevant measures impacting the network layer QoS (directly or indirectly). For the foregoing items i-iii, the empirical distribution in $\Delta t$ is well suited to describe the environment as perceived by each device in a population of devices comprising a cyber-physical system. Therefore, the proposed technique(s) may rely on certain statistics of these measures, namely 5th percentile, median, mean, and 95th percentile. The rest of the measures (i.e., iv-vi), are counters and a simple mean within $\Delta t$ in the state would be sufficient.

The action space is the set of decision parameters through which the RLO interacts with the environment. Assume that transmission power is quantized into M+2 power levels as $\mathcal{P}:=\{p_{min}, p_1, p_2, \ldots, p_M, p_{max}\}$. For an example cyber-physical production control problem, the action space for each device is $\mathcal{A}:=[N_1]\times[N_2]\times \ldots \times[N_{N_f}]\times\mathcal{P}$, where $[N]:=\{n|n\in \mathbb{N}, n\leq N\}$, and $\times$ represents cartesian product.

As for an example reward function, its objective is to maximize long-term availability and reliability of a cyber-physical system. However, the RLO acts on estimations of availability, $\bar{a}_{ij}$, and crossing rate, $\bar{l}_{ij}$, where the crossing rate can be understood as a measure of reliability. There is a problem of "delayed" reward (i.e., to observe the impact of each action immediately in the reward function). Hence, the objective considered by the RLO with respect to a population of devices comprising a cyber-physical system is based on maximizing the availability estimators and minimize the crossing rates for the devices. The reward function, R(t), therefore may be formulated as $$R(t) = \frac{1}{K\zeta}\left(\zeta \sum_{i=1}^{|C|}\sum_{j=1}^{K_i}\bar{a}_{ij}(\Delta t) - (1-\zeta)\sum_{i=1}^{|C|}\sum_{j=1}^{K_i}\bar{l}_{ij}(\Delta t)\right). \quad (6)$$

In the above expression, $\zeta$ is the weight specifying the relative importance of availability and crossing rate, respectively. The $$\frac{1}{K\zeta}$$

scales the reward function to have an upper bound of 1. Moreover, the step period of RL is denoted by $\Delta t$ at the end of which the reward is calculated at time t. For instance, example simulations of the proposed scheme set $\Delta t$ to one second, with the corresponding gathering of statistics for availability and crossing-rate determinations in the one second windows and calculation of the reward at time step t+1 with those statistics.

Figure 6:
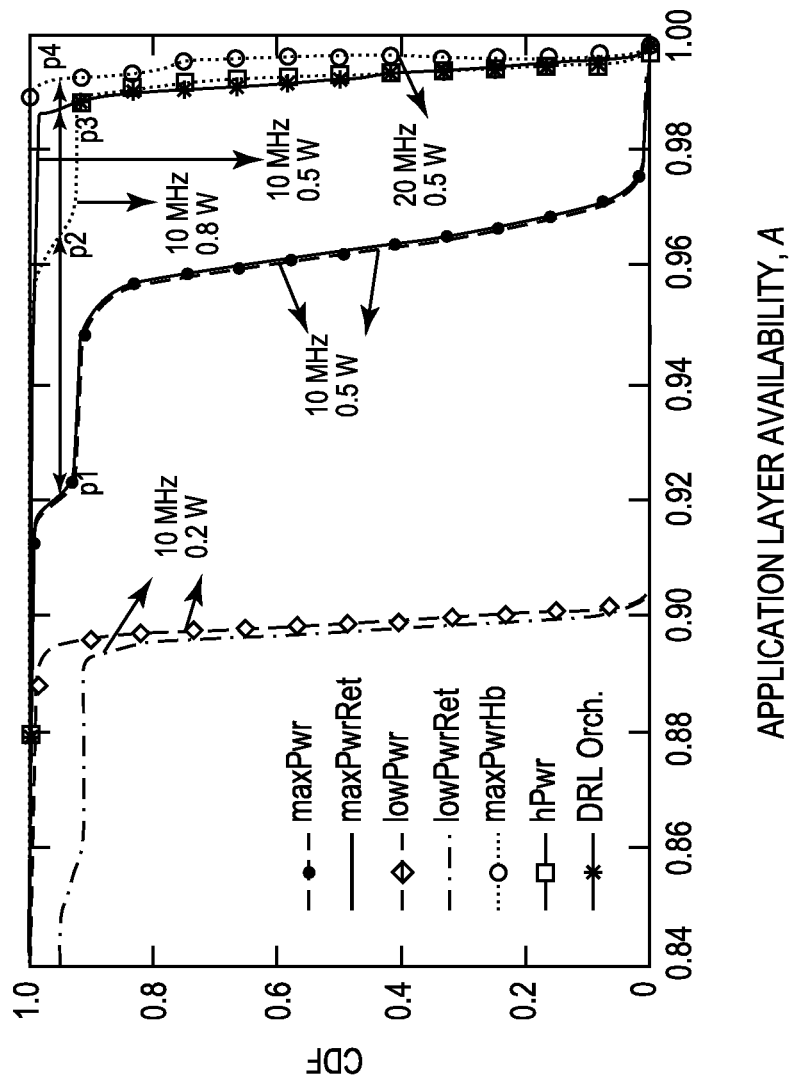
FIG. 6 is a plot of application layer availability for different orchestration scenarios, as compared to baselines.
Figure 7:
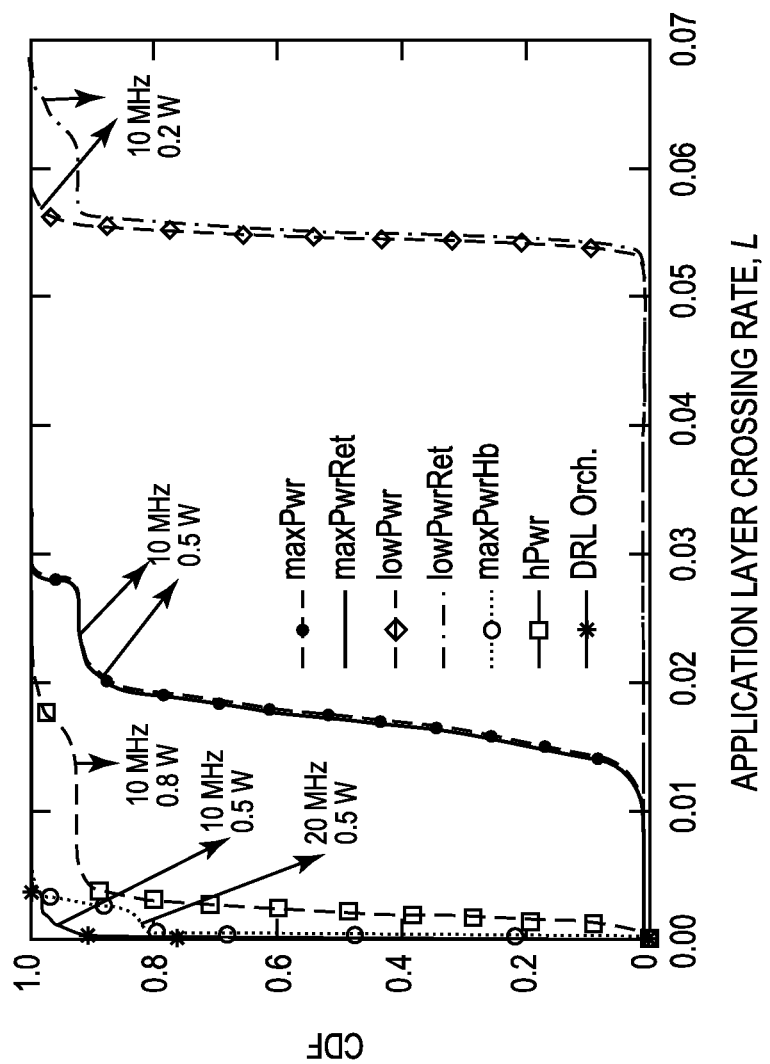
FIG. 7 is a plot of application layer crossing rate, as a representation of application layer reliability, for different orchestration scenarios.
Figure 8:
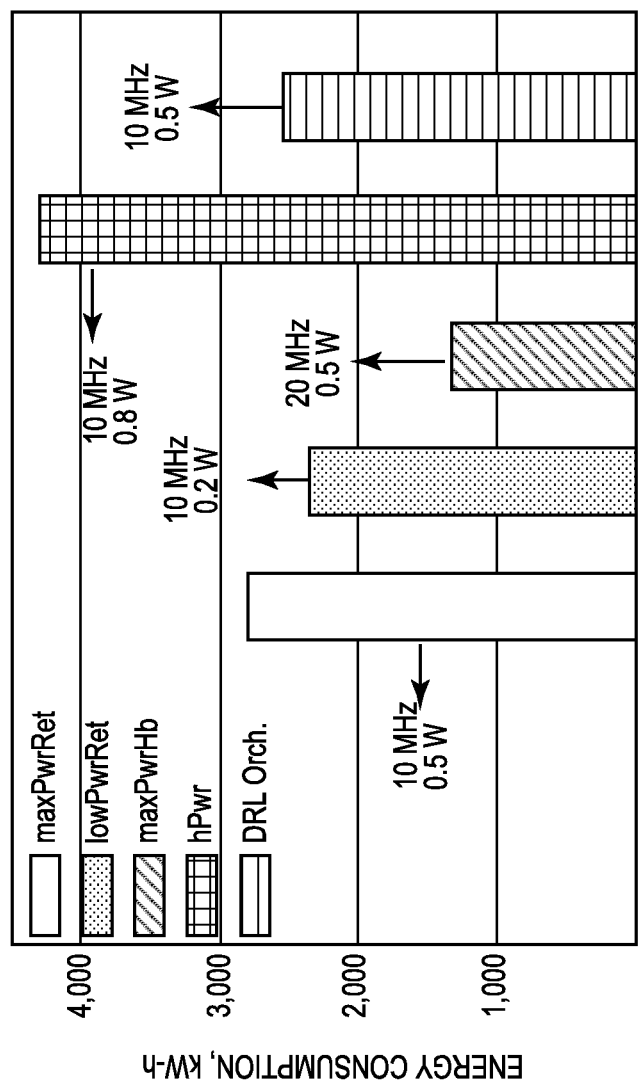
FIG. 8 is a plot of energy consumption compared to baselines.

Three hundred 100-second simulations were run, using the same random seed for all comparisons in FIGS. 6-8, which represent simulation results. Further, the simulations considered several baselines, including:

maxPwr/maxPwrRet: set as a 10 MHz bandwidth with numerology 1 (i.e., there are 25 resource blocks in each slot) and the maximum transmission power set as 0.5 W, implying that all resource blocks were configured with 0.02 W, while setting the maximum number of transmissions as 1 and 2, respectively;

lowPwr/lowPwrRet: set as a 10 MHz bandwidth with numerology 1 (i.e., there are 25 resource blocks in each slot), and the maximum transmission power is 0.2 W, implying that all resource blocks were configured with 0.008 W, while setting the maximum number of transmissions as 1 and 2, respectively;

maxPwrHb: the allocated bandwidth was changed to 20 MHz (from 10 MHz default) with numerology 1 (i.e., there are 50 resource blocks in each slot), and the maximum transmission power was set to 0.5 W, implying that all resource blocks were configured with 0.01 W, while setting the maximum number of transmissions as 2; and hPwr: set as a 10 MHz bandwidth with numerology 1 (i.e., there are 25 resource blocks in each slot), and the maximum transmission power is 0.8 W, implying that all resource blocks were configured with 0.032 W, while setting the maximum number of transmissions as 2.

For the RLO, the simulation(s) used a 10 MHz bandwidth in a URLLC slice with numerology 1 (i.e., there are 25 resource blocks in each slot). The RLO ("DRL Orch." in FIGS. 6-8) configures the transmission power to each device by selecting either max power, 0.02 W per resource block, or min power, 0.008 W per resource block. It also decides on the maximum number of transmissions to each device by enabling/disabling retransmissions.

FIGS. 6 and 7 illustrate application layer KPIs, in which the average of the availability of all devices, $\{a_{ij}\}_{\{ij\}}$, and crossing rates, $\{l_{ij}\}_{\{ij\}}$, in each simulation is defined as A and L, respectively. In particular, FIG. 6 plots application layer availability and FIG. 7 plots application layer crossing rates.

In FIG. 6, each sample in complementary cumulative distribution function (CCDF) is the average availability of a 100-second simulation. As suggested in the plots, retransmissions in lowPwrRet lead to lower availability and higher crossing rate than in lowPwr. A careful analysis of the results shows that lowPwrRet has 1.6% higher loss on the Packet Data Convergence Protocol (PDCP) layer but almost none is lost on the Radio Link Control (RLC) layer. Likely, continuous retransmissions to devices with poor channel quality increased the cell load(s), resulting in a higher number of packets losing their delay bound. Moreover, from FIG. 6, the proposed orchestration achieves 6.5% higher 5th percentile availability compared to highPwrRet (i.e., from point $p_1$ to $p_3$ in FIG. 6). Meanwhile, the benchmark baseline with twice the bandwidth, highPwrHb, achieves only 7% higher 5th percentile in availability than highPwrRet (i.e., from point $p_1$ to $p_4$). In other words, the proposed orchestration achieves 93% of this gain with half bandwidth, leading to a substantial saving in the network operational costs. Moreover, the benchmark with maximum transmission power of 0.8 W, hPwr, achieves only 4.5% higher 5th percentile in availability than highPwrRet (i.e., from point $p_1$ to $p_2$), 30% lower than what is achieved by the proposed orchestration. However, its performance is closer for higher percentile availabilities. The gain in using the proposed orchestration is due to properly addressing the tradeoff between the delay, power, and packet loss. From the crossing rate perspective, shown in FIG. 7, the RLP/RLO implementation disclosed herein could achieve even lower crossing rates. Because packets experience a very low delay in the highPwrHb case, it is likely that low SINR is the major cause for packet loss in highPwrHb. However, the disclosed RLP/RLO techniques avoid such low SINR to a great extent by using dynamic power control, and hence get close to the performance of the highPwrHb baseline but with only half the bandwidth.

FIG. 8 illustrates the energy consumption of the RLP/RLO orchestration scheme in the simulation context described above, along with that of the baselines. As the figure shows, the proposed orchestration consumes almost the same energy as consumed in the lowPwrRet baseline and slightly less energy than consumed in the maxPwrRet baseline. However, it has superior performance in terms of application layer reliability KPIs. Compared to maxPwrHb, orchestration of transmit parameters on the involved wireless links results in a 1.9× energy consumption while requiring half the bandwidth. Compared to the hPwr baseline, the proposed orchestration reduces energy consumption by 40% while still achieving better application layer reliability and availability for the cyber-physical system. This result implies that the disclosed techniques for orchestration of transmit diversity and power control settings on the wireless links used to interconnect devices of a cyber-physical system achieves reliability and availability that prior-art solutions might achieve using either double bandwidth or 1.7× energy consumption.

FIG. 9 illustrates an example wireless communication network 10 that provides radio links 12 for communicatively interconnecting a population of devices 14 comprising a cyber-physical system 16. The radio links 12 may be referred to as wireless links 12, and they are used to carry messages or other signaling to or from respective ones of the devices 14, where those messages or signaling comprise application-layer communications used by respective applications running on the device 14, for fulfillment of their respective operations or roles in the cyber-physical system 16.

The wireless communication network 10—network 10—includes a Radio Access Network (RAN) 20, with the RAN 20 including one or more radio access nodes 22, such as "gNBs" in a 5G implementation of the network 10. The network 10 further includes or is associated with one or more network nodes 30 that implement an RLP and an RLO as described herein. Note that ancillary or supporting nodes, such as OAM nodes are not shown for simplicity.

The one or more network nodes 30 comprise one or more computer servers, for example, with communication interfaces. In the diagram, the one or more network nodes 30 are not in the RAN portion of the network 10. For example, they may reside in a Core Network (CN) portion of the network 10 or they may comprise host computing resources in a data center communicatively coupled to the CN portion of the network 10. Because of the non-real-time or near-real-time operations carried out by the RLP and RLO, there is significant flexibility in where and how they are implemented.

Of course, in one or more embodiments, the network node(s) 30 may be implemented as RAN nodes, either in a centralized fashion wherein one or more RLPs and/or RLOs support multiple radio access nodes 22 and their served devices 14 or integrated into the functionalities of the respective radio access nodes 22. In at least one embodiment, the RLP and RLO functionalities are realized in the network node(s) used to manage one or more network slices used to serve one or more populations of devices 14 operating as cyber-physical systems 16. Thus, in an example embodiment, the network node(s) 30 shown in FIGS. 9-11 may operate as a Network Slice Selection Management Function (NSSMF), such as shown in FIG. 1, with the NSSMF being configured to provide the RLO/RLP operations described herein.

In the example depicted in FIG. 9, the orchestration decisions—i.e., the control decisions that comprise control transmit power settings and transmit diversity settings used for communication to or from the devices 14 being managed—may flow in the network 10 as signaling. In an example case, the signaling targets the radio access nodes 22 that serve the devices 14—i.e., that provide the respective wireless links 12 for the devices 14. For example, signaling to control the transmit power and/or diversity settings used by the radio access nodes 22 for downlink transmissions to respective ones of the devices 14 and/or signaling to cause the radio access nodes 22 to set the transmit power and/or diversity settings used by the devices 14 for uplink transmissions on the wireless links 12. Such signaling may be updated on a per control cycle basis, wherein the RLO makes new control decisions in each control cycle in a continuing succession of control cycles.

FIG. 10 depicts example implementation details for a network node 30 that implements the RLP and/or RLO functionality described herein, including any of the translation operations associated with translating observations of channel conditions and communication-network loading into estimations of application-layer availability and reliability.

In the depicted example, the network node 30 includes communication interface circuitry 40, which provides transceiver functions—transmitting and receiving—via included transmitter circuitry (TX) 42 and receiver circuitry (RX) 44. The communication interface circuitry 40 comprises, for example, an Ethernet interface or other computer-network interface, and it is operative to communicatively couple the network node 30 to one or more other nodes in the wireless communication network or to intermediary nodes, such as gateways, routers, or the like, for communicating with nodes in the network. In an example embodiment or operating scenario, the communication interface circuitry 40 provides a signaling interface by which the network node 30 sends signaling indicating orchestration decisions, with such signaling flowing directly or indirectly to the radio access nodes 22 that provide the wireless links 12 to which those orchestration decisions pertain.

The network node 30 further comprises processing circuitry 46 that includes or is associated with storage 48. The processing circuitry 46 comprises fixed circuitry or programmatically-configured circuitry or a combination of fixed and programmatically-configured circuitry. As particular examples, the processing circuitry 46 comprises, for example, any one or more of a microprocessor, a Digital Signal Processor (DSP), a Field Programmable Gate Array (FPGA), an Application Specific Integrated Circuit (ASIC), or multiple such devices. In at least one embodiment, the processing circuitry 46 comprises one or more microprocessors or other computing circuitry that is specially adapted to carry out the RLP and/or RLO functions disclosed herein, based on the execution of stored computer programs. To that end, the storage 48 included in the example network node comprises one or more types of computer-readable media providing non-transient storage for one or more computer programs (CP) 50. Such storage provides any one or more of long-term storage and temporary volatile storage or so-called working memory for program execution and examples of storage devices or circuits include SRAM, DRAM, FLASH, or other Solid State Disk (SSD) device, EEPROM, and magnetic storage.

The storage 48 also may hold configuration data (CFG. DATA) 52. For example, the network node 30 implementing the RLO functionality may hold a reward function and associated weights as configuration data, wherein such data may be updated by the RLP and is used by the RLO for carrying out the computations used by it to determine its control decisions.

FIG. 11 illustrates a further variation of a network node 30 that implements one or both the RLP and RLO functionality. As compared to FIG. 10, the communication interface circuitry 40 of the network node 30 includes transmitter and receiver circuitry 42-1, 44-1, for network communications, e.g., exchanging signaling with other nodes in the network 10, and transmitter and receiver circuitry 42-2, 44-2, for transmitting and receiving via an air interface. Correspondingly, the communication interface circuitry 40 includes an antenna interface 56, for coupling to one or more antennas 58 used for transmitting/receiving via the air interface.

The arrangement depicted in FIG. 11 applies, for example, where the RLP and/or RLO functionality is implemented in a radio access node 22 that provides the cellular radio connectivity for serving one of more of the devices 14 in a population of devices 14 subject to orchestration management by the RLO/RLP. Of course, it should be understood that an RLP/RLO may provide respective orchestration management for more than one distinct population of devices 14, e.g., one RLP and/or RLO may make separate sets of control decisions for respective populations of devices served by different network slices. The learned reward function used for the respective device populations may be different or at least may be tuned differently, e.g., depending on the involved KPIs, the nature of the service, prevailing conditions, etc.

Figure 12:
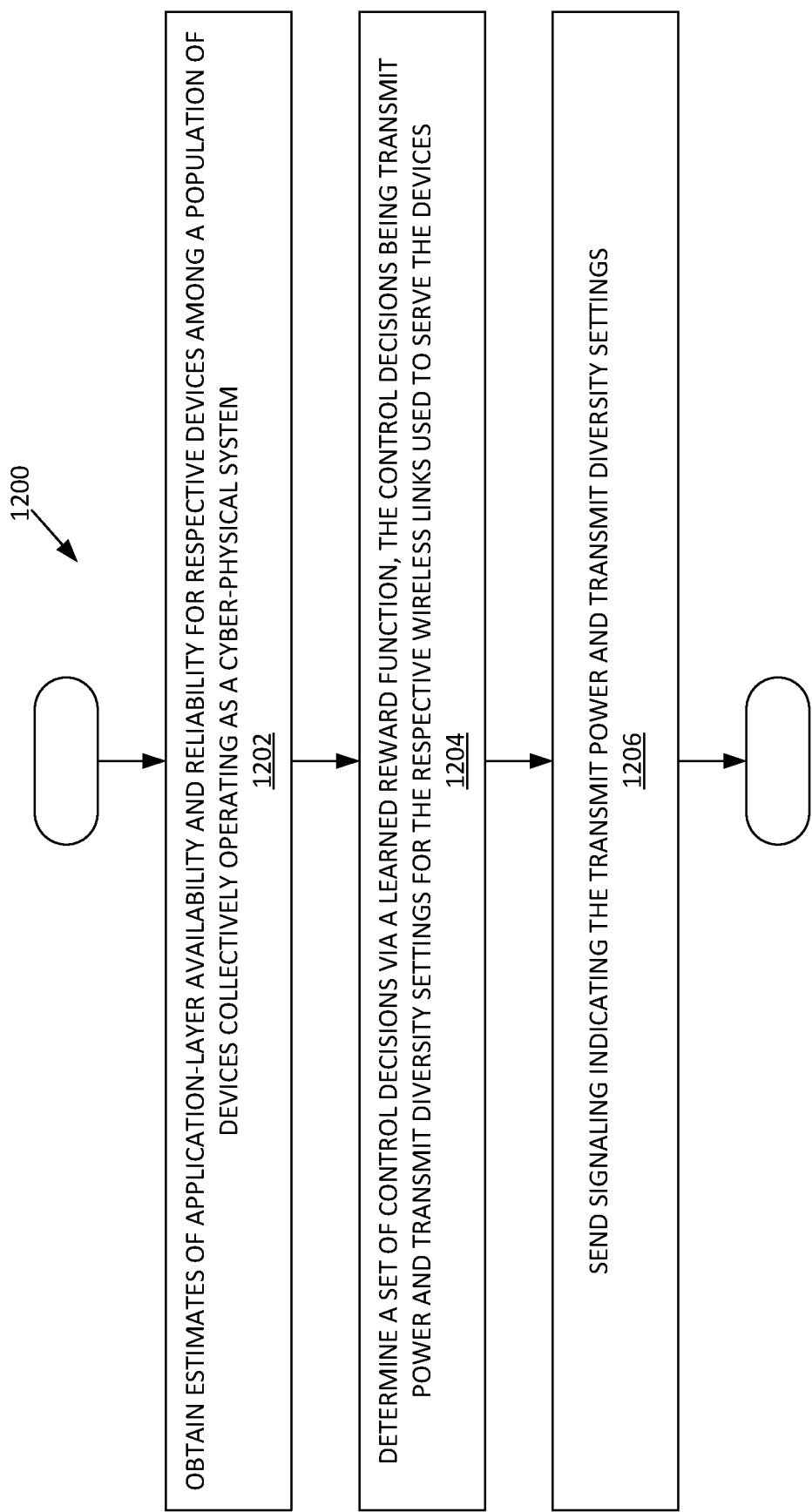
FIG. 12 is a logic flow diagram of a method of operation by a network node, according to an example embodiment.

FIG. 12 is a logic flow diagram illustrating a method 1200 performed by a network node 30 of network 10, in an example embodiment. The steps or operations illustrated may be part of a larger set of processing operations and may be looped or repeated and may be performed on an ongoing basis with respect to each among one or more populations of devices 14 being managed.

The method 1200 comprises, in each control cycle in a continuing succession of control cycles, performing control operations that include: obtaining (1202) estimates of application-layer availability and reliability for respective devices 14 among a population of devices collectively operating as a cyber-physical system 16, each device executing one or more respective applications that run in dependence on cyber-physical system communications exchanged over a respective wireless link 12 provided by the network, such that the estimates of application-layer availability and reliability depend on channel conditions of the respective wireless links and loading conditions in the wireless communication network, bearing on delivery of the cyber-physical system communications; determining (1204) a set of control decisions via a learned reward function that takes the estimates of application-layer availability and reliability as inputs and is trained to determine the set of control decisions as transmit power and transmit diversity settings for transmitting on the respective wireless links, for maximization of application-layer availability and reliability in the cyber-physical system, subject to transmit power and bandwidth allocations of the wireless communication network for supporting the cyber-physical system; and sending (1206) signaling indicating the transmit power and transmit diversity settings.

One or more radio access nodes 22 of the network 10 each support one or more of the respective wireless links 12 and sending (1206) the signaling in one or more embodiments comprises sending, to each such radio access node 22, particular signaling indicating the transmit power and transmit diversity settings for the one or more respective wireless links 12 supported by the radio access node 22. The transmit power and transmit diversity settings are downlink transmit power and transmit diversity settings in one embodiment or as one example. In another embodiment or example, the transmit power and transmit diversity settings are uplink transmit power and diversity settings used by the respective devices 14 for transmitting on the wireless links 12. In another embodiment or example, orchestration operations determine both downlink and uplink settings for transmit power and diversity.

Obtaining (1202) the estimates of application-layer availability and reliability comprises, for example, deriving them from the channel conditions and the loading conditions. As particular example, obtaining (1202) the estimations of application-layer availability and reliability comprises deriving them for the respective devices 14, based on statistics collected over a time interval for transmissions to or from each of the respective devices 14.

The respective devices 14 are served by a network slice provided via the network 10, according to one or more embodiment. Correspondingly, one or more Quality-of-Service (QoS) parameters of the network slice are configured for Ultra Reliable Low Latency Communication (URLLC), and the transmit power and bandwidth allocations are power and bandwidth limitations applicable to the network slice.

In one or more examples, the cyber-physical system 16 comprises an industrial control network and the population of devices 14 comprises a mix of sensors and actuators communicatively linked together by the network 10.

The method 1200 further comprises in one or more embodiments carrying out reinforcement learning to form the learned reward function. In at least one such embodiment, a Reinforcement Learning Planner (RLP) carries out the reinforcement learning on a recurring or continuing basis, and wherein a Reinforcement Learning Orchestrator (RLO) performs the control operations in each control cycle. The RLP and RLO are implemented, for example, in one or more network nodes 30 that are included in or associated with the network 10.

A learning cycle of the RLP is slower than the control cycle of the RLP, in one or more embodiments, meaning that the learning cycles of the RLP may consider statistics developed over many control cycles, at least some of which may be performed in an explicit training phase. The RLP in one or more embodiments performs hyperparameter tuning of the learned reward function, over one or more learning cycles.

In at least one embodiment, the method 1200 comprises determining statistics from the estimates of application-layer availability and reliability taken over multiple control cycles, comparing the statistics with corresponding Key Performance Indicators (KPIs) reflecting system-level availability and reliability goals for the cyber-physical system, and, in dependence on the comparing, requesting, from an Operations and Maintenance (OAM) function of the network 10, changes to the transmit power and bandwidth allocations.

With the various aspects of the method 1200 in mind, at least one embodiment comprises one or more network nodes 30 that are configured for operation with respect to a network 10 that provides wireless links 12 for interconnecting devices 14 among a population of devices collectively comprising a cyber-physical system 16. The one or more nodes include processing circuitry that is configured to carry out any or all of the operations discussed in the context of the method 1200 or, more generally, any of the RLP/RLO operations described herein.

As a particular example, the one or more nodes 30 include: communication interface circuitry 40 and processing circuitry 46. The processing circuitry 46 is configured to perform control operations in each control cycle in a continuing succession of control cycles, the processing circuitry 46 being particularly configured to: (a) obtain estimates of application-layer availability and reliability for respective devices 14 among the population of devices 14, each device 14 executing one or more respective applications that run in dependence on cyber-physical system communications exchanged over a respective wireless link 12 provided by the network 10, such that the estimates of application-layer availability and reliability depend on channel conditions of the respective wireless links 12 and loading conditions in the network 10 that bear on delivery of the cyber-physical system communications; (b) determine a set of control decisions via a learned reward function that takes the estimates of application-layer availability and reliability as inputs and is trained to determine the set of control decisions as transmit power and transmit diversity settings for transmitting on the respective wireless links 12, for maximization of application-layer availability and reliability in the cyber-physical system 16, subject to transmit power and bandwidth allocations of the network 10 for supporting the cyber-physical system 16; and (c) send, via the communication interface circuitry, signaling indicating the transmit power and transmit diversity settings.

Figure 13:
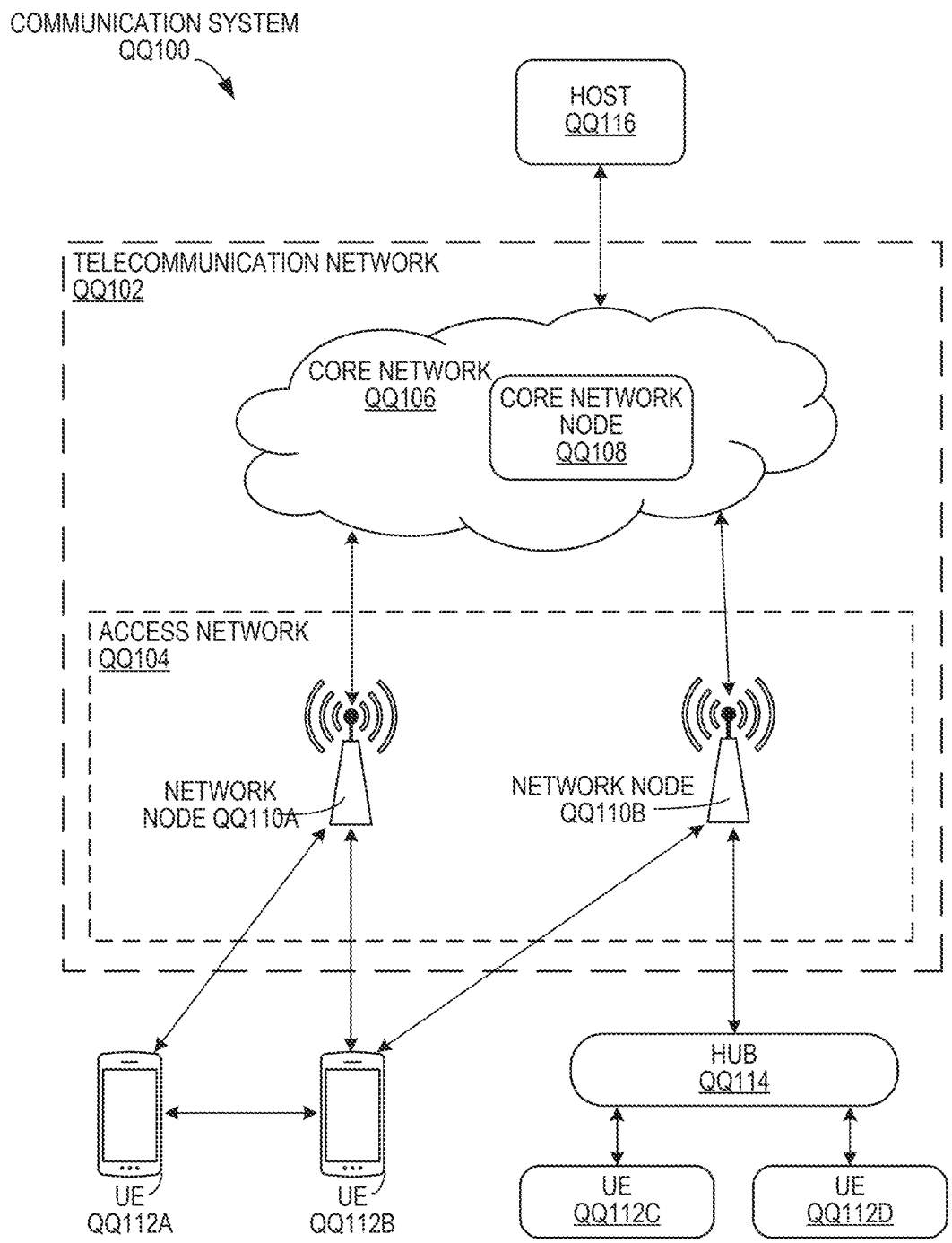
FIG. 13 is a block diagram of a communication system, according to an example embodiment.

FIG. 13 shows an example of a communication system QQ100 in accordance with some embodiments. FIG. 13 can be understood as providing a more detailed example of details for the network 10 introduced in FIG. 9.

In the example, the communication system QQ100 includes a telecommunication network QQ102 that includes an access network QQ104, such as a radio access network (RAN), and a core network QQ106, which includes one or more core network nodes QQ108. The access network QQ104 includes one or more access network nodes, such as network nodes QQ110a and QQ110b (one or more of which may be generally referred to as network nodes QQ110), or any other similar 3rd Generation Partnership Project (3GPP) access node or non-3GPP access point. The network nodes QQ110 facilitate direct or indirect connection of user equipment (UE), such as by connecting UEs QQ112a, QQ112b, QQ112c, and QQ112d (one or more of which may be generally referred to as UEs QQ112) to the core network QQ106 over one or more wireless connections.

Here, the UEs QQ112A and QQ112B may be understood as example devices 14 that are subject to RLP/RLO orchestration—i.e., one or more transmit parameters, such as transmit power settings and transmit diversity settings, are decided for the involved wireless links 12 over succeeding RLO control cycles, based on the RLP/RLO orchestration operations described herein. Further, while the network node(s) 30 implementing the RLP and RLO functionality are not explicitly shown in FIG. 13, they may be implemented in the network nodes QQ110A and/or QQ110B, or in the CN QQ106.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system QQ100 may include any number of wired or wireless networks, network nodes, UEs, and/or any other components or systems that may facilitate or participate in the communication of data and/or signals whether via wired or wireless connections. The communication system QQ100 may include and/or interface with any type of communication, telecommunication, data, cellular, radio network, and/or other similar type of system.

The UEs QQ112 may be any of a wide variety of communication devices, including wireless devices arranged, configured, and/or operable to communicate wirelessly with the network nodes QQ110 and other communication devices. Similarly, the network nodes QQ110 are arranged, capable, configured, and/or operable to communicate directly or indirectly with the UEs QQ112 and/or with other network nodes or equipment in the telecommunication network QQ102 to enable and/or provide network access, such as wireless network access, and/or to perform other functions, such as administration in the telecommunication network QQ102.

In the depicted example, the core network QQ106 connects the network nodes QQ110 to one or more hosts, such as host QQ116. These connections may be direct or indirect via one or more intermediary networks or devices. In other examples, network nodes may be directly coupled to hosts. The core network QQ106 includes one more core network nodes (e.g., core network node QQ108) that are structured with hardware and software components. Features of these components may be substantially similar to those described with respect to the UEs, network nodes, and/or hosts, such that the descriptions thereof are generally applicable to the corresponding components of the core network node QQ108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host QQ116 may be under the ownership or control of a service provider other than an operator or provider of the access network QQ104 and/or the telecommunication network QQ102 and may be operated by the service provider or on behalf of the service provider. The host QQ116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system QQ100 of FIG. 13 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (Wi-Fi); and/or any other appropriate wireless communication standard, such as the Worldwide Interoperability for Microwave Access (WiMAX), Bluetooth, Z-Wave, Near Field Communication (NFC) ZigBee, LiFi, and/or any low-power wide-area network (LPWAN) standards such as LoRa and Sigfox.

In some examples, the telecommunication network QQ102 is a cellular network that implements 3GPP standardized features. Accordingly, the telecommunications network QQ102 may support network slicing to provide different logical networks to different devices that are connected to the telecommunication network QQ102. For example, the telecommunications network QQ102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs QQ112 are configured to transmit and/or receive information without direct human interaction. For instance, a UE may be designed to transmit information to the access network QQ104 on a predetermined schedule, when triggered by an internal or external event, or in response to requests from the access network QQ104. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub QQ114 communicates with the access network QQ104 to facilitate indirect communication between one or more UEs (e.g., UE QQ112c and/or QQ112d) and network nodes (e.g., network node QQ110b). In some examples, the hub QQ114 may be a controller, router, content source and analytics, or any of the other communication devices described herein regarding UEs. For example, the hub QQ114 may be a broadband router enabling access to the core network QQ106 for the UEs. As another example, the hub QQ114 may be a controller that sends commands or instructions to one or more actuators in the UEs. Commands or instructions may be received from the UEs, network nodes QQ110, or by executable code, script, process, or other instructions in the hub QQ114. As another example, the hub QQ114 may be a data collector that acts as temporary storage for UE data and, in some embodiments, may perform analysis or other processing of the data. As another example, the hub QQ114 may be a content source. For example, for a UE that is a VR headset, display, loudspeaker or other media delivery device, the hub QQ114 may retrieve VR assets, video, audio, or other media or data related to sensory information via a network node, which the hub QQ114 then provides to the UE either directly, after performing local processing, and/or after adding additional local content. In still another example, the hub QQ114 acts as a proxy server or orchestrator for the UEs, in particular in if one or more of the UEs are low energy IoT devices.

The hub QQ114 may have a constant/persistent or intermittent connection to the network node QQ110b. The hub QQ114 may also allow for a different communication scheme and/or schedule between the hub QQ114 and UEs (e.g., UE QQ112c and/or QQ112d), and between the hub QQ114 and the core network QQ106. In other examples, the hub QQ114 is connected to the core network QQ106 and/or one or more UEs via a wired connection. Moreover, the hub QQ114 may be configured to connect to an M2M service provider over the access network QQ104 and/or to another UE over a direct connection. In some scenarios, UEs may establish a wireless connection with the network nodes QQ110 while still connected via the hub QQ114 via a wired or wireless connection. In some embodiments, the hub QQ114 may be a dedicated hub—that is, a hub whose primary function is to route communications to/from the UEs from/to the network node QQ110b. In other embodiments, the hub QQ114 may be a non-dedicated hub—that is, a device which is capable of operating to route communications between the UEs and network node QQ110b, but which is additionally capable of operating as a communication start and/or end point for certain data channels.

Figure 14:
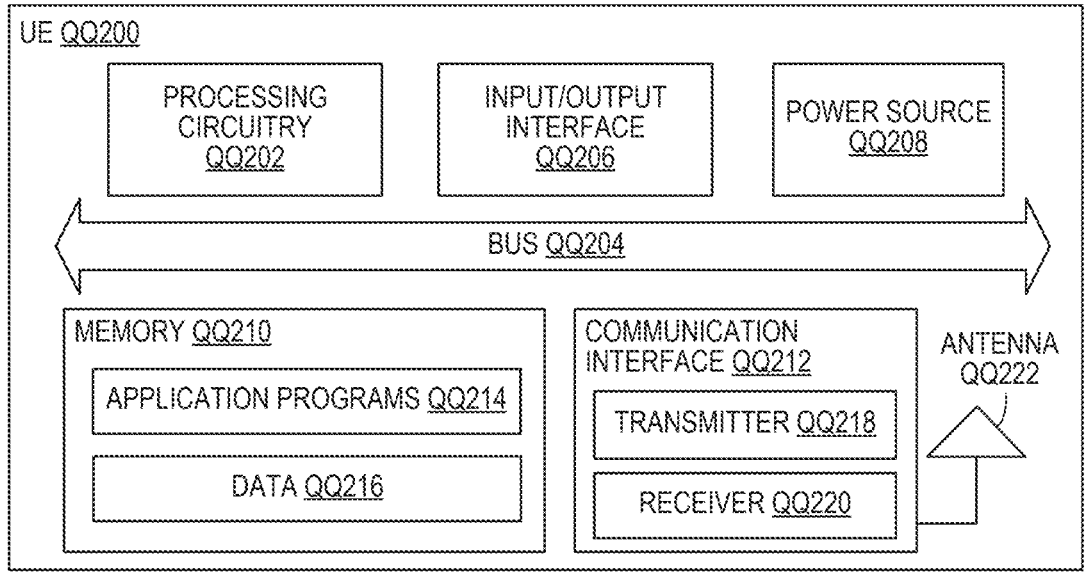
FIG. 14 is a block diagram of a User Equipment (UE), according to an example embodiment.

FIG. 14 shows a UE QQ200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

Broadly, however, with respect to the RLP/RLO orchestration operations and techniques described herein, the UE QQ200 can be understood as comprising or being associated with a device 14 that is among a population of devices 14 operating as a cyber-physical system 16. As such, transmissions to the UE QQ200 and/or from the UE QQ200 are performed in accordance with transmit power and/or diversity settings determined by the RLO according to its orchestration of such settings for all of the wireless links provided by the network 10 for serving the population of devices 14.

The UE QQ200 includes processing circuitry QQ202 that is operatively coupled via a bus QQ204 to an input/output interface QQ206, a power source QQ208, a memory QQ210, a communication interface QQ212, and/or any other component, or any combination thereof. Certain UEs may utilize all or a subset of the components shown in FIG. 14. The level of integration between the components may vary from one UE to another UE. Further, certain UEs may contain multiple instances of a component, such as multiple processors, memories, transceivers, transmitters, receivers, etc.

The processing circuitry QQ202 is configured to process instructions and data and may be configured to implement any sequential state machine operative to execute instructions stored as machine-readable computer programs in the memory QQ210. The processing circuitry QQ202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry QQ202 may include multiple central processing units (CPUs).

In the example, the input/output interface QQ206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE QQ200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source QQ208 is structured as a battery or battery pack. Other types of power sources, such as an external power source (e.g., an electricity outlet), photovoltaic device, or power cell, may be used. The power source QQ208 may further include power circuitry for delivering power from the power source QQ208 itself, and/or an external power source, to the various parts of the UE QQ200 via input circuitry or an interface such as an electrical power cable. Delivering power may be, for example, for charging of the power source QQ208. Power circuitry may perform any formatting, converting, or other modification to the power from the power source QQ208 to make the power suitable for the respective components of the UE QQ200 to which power is supplied.

The memory QQ210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory QQ210 includes one or more application programs QQ214, such as an operating system, web browser application, a widget, gadget engine, or other application, and corresponding data QQ216. The memory QQ210 may store, for use by the UE QQ200, any of a variety of various operating systems or combinations of operating systems.

The memory QQ210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory QQ210 may allow the UE QQ200 to access instructions, application programs and the like, stored on transitory or non-transitory memory media, to off-load data, or to upload data. An article of manufacture, such as one utilizing a communication system may be tangibly embodied as or in the memory QQ210, which may be or comprise a device-readable storage medium.

The processing circuitry QQ202 may be configured to communicate with an access network or other network using the communication interface QQ212. The communication interface QQ212 may comprise one or more communication subsystems and may include or be communicatively coupled to an antenna QQ222. The communication interface QQ212 may include one or more transceivers used to communicate, such as by communicating with one or more remote transceivers of another device capable of wireless communication (e.g., another UE or a network node in an access network). Each transceiver may include a transmitter QQ218 and/or a receiver QQ220 appropriate to provide network communications (e.g., optical, electrical, frequency allocations, and so forth). Moreover, the transmitter QQ218 and receiver QQ220 may be coupled to one or more antennas (e.g., antenna QQ222) and may share circuit components, software, or firmware, or alternatively be implemented separately.

In the illustrated embodiment, communication functions of the communication interface QQ212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMAX, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface QQ212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE QQ200 shown in FIG. 14.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 15:
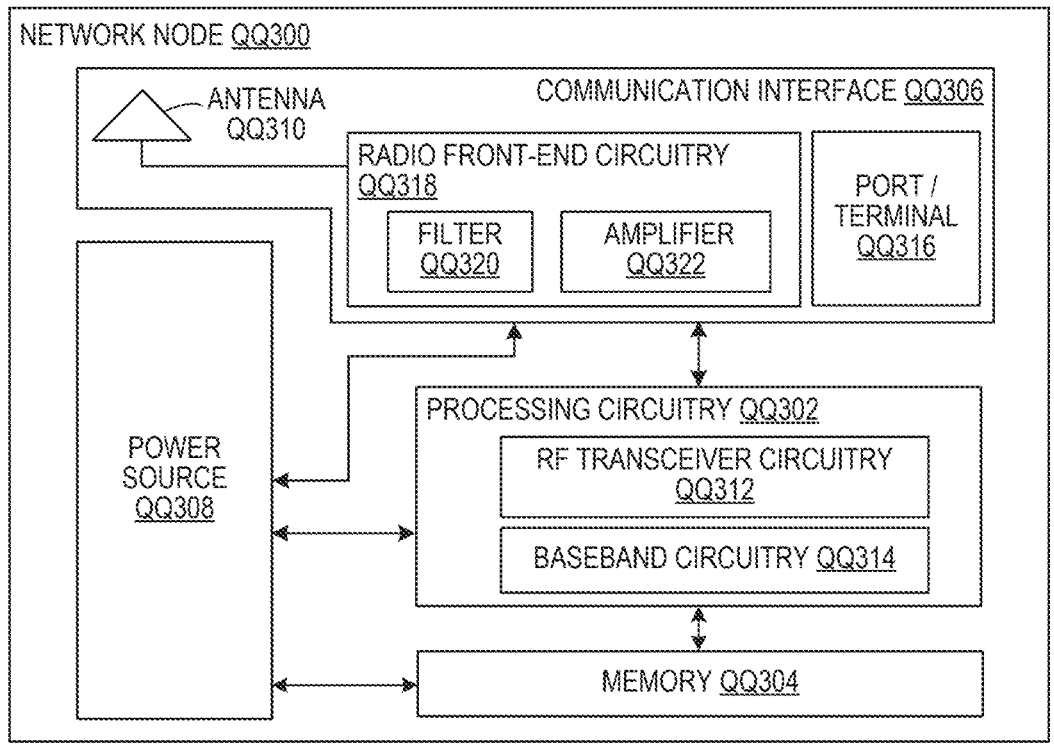
FIG. 15 is a block diagram of a network node, according to an example embodiment.

FIG. 15 shows a network node QQ300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

Of particular interest herein, the example network node QQ300 implements the RLP and/or RLO functionality described herein, for orchestrating transmit power control and/or diversity with respect to the wireless links used to serve respective devices 14 among a population of devices 14 operating as a cyber-physical system 16.

The network node QQ300 includes a processing circuitry QQ302, a memory QQ304, a communication interface QQ306, and a power source QQ308. The network node QQ300 may be composed of multiple physically separate components (e.g., a NodeB component and a RNC component, or a BTS component and a BSC component, etc.), which may each have their own respective components. In certain scenarios in which the network node QQ300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node QQ300 may be configured to support multiple radio access technologies (RATs). In such embodiments, some components may be duplicated (e.g., separate memory QQ304 for different RATs) and some components may be reused (e.g., a same antenna QQ310 may be shared by different RATs). The network node QQ300 may also include multiple sets of the various illustrated components for different wireless technologies integrated into network node QQ300, for example GSM, WCDMA, LTE, NR, Wi-Fi, Zigbee, Z-wave, LoRaWAN, Radio Frequency Identification (RFID) or Bluetooth wireless technologies. These wireless technologies may be integrated into the same or different chip or set of chips and other components within network node QQ300.

The processing circuitry QQ302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ300 components, such as the memory QQ304, to provide network node QQ300 functionality.

In some embodiments, the processing circuitry QQ302 includes a system on a chip (SOC). In some embodiments, the processing circuitry QQ302 includes one or more of radio frequency (RF) transceiver circuitry QQ312 and baseband processing circuitry QQ314. In some embodiments, the radio frequency (RF) transceiver circuitry QQ312 and the baseband processing circuitry QQ314 may be on separate chips (or sets of chips), boards, or units, such as radio units and digital units. In alternative embodiments, part or all of RF transceiver circuitry QQ312 and baseband processing circuitry QQ314 may be on the same chip or set of chips, boards, or units.

The memory QQ304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry QQ302. The memory QQ304 may store any suitable instructions, data, or information, including a computer program, software, an application including one or more of logic, rules, code, tables, and/or other instructions capable of being executed by the processing circuitry QQ302 and utilized by the network node QQ300. The memory QQ304 may be used to store any calculations made by the processing circuitry QQ302 and/or any data received via the communication interface QQ306. In some embodiments, the processing circuitry QQ302 and memory QQ304 is integrated.

The communication interface QQ306 is used in wired or wireless communication of signaling and/or data between a network node, access network, and/or UE. As illustrated, the communication interface QQ306 comprises port(s)/terminal(s) QQ316 to send and receive data, for example to and from a network over a wired connection. The communication interface QQ306 also includes radio front-end circuitry QQ318 that may be coupled to, or in certain embodiments a part of, the antenna QQ310. Radio front-end circuitry QQ318 comprises filters QQ320 and amplifiers QQ322. The radio front-end circuitry QQ318 may be connected to an antenna QQ310 and processing circuitry QQ302. The radio front-end circuitry may be configured to condition signals communicated between antenna QQ310 and processing circuitry QQ302. The radio front-end circuitry QQ318 may receive digital data that is to be sent out to other network nodes or UEs via a wireless connection. The radio front-end circuitry QQ318 may convert the digital data into a radio signal having the appropriate channel and bandwidth parameters using a combination of filters QQ320 and/or amplifiers QQ322. The radio signal may then be transmitted via the antenna QQ310. Similarly, when receiving data, the antenna QQ310 may collect radio signals which are then converted into digital data by the radio front-end circuitry QQ318. The digital data may be passed to the processing circuitry QQ302. In other embodiments, the communication interface may comprise different components and/or different combinations of components.

In certain alternative embodiments, the network node QQ300 does not include separate radio front-end circuitry QQ318, instead, the processing circuitry QQ302 includes radio front-end circuitry and is connected to the antenna QQ310. Similarly, in some embodiments, all or some of the RF transceiver circuitry QQ312 is part of the communication interface QQ306. In still other embodiments, the communication interface QQ306 includes one or more ports or terminals QQ316, the radio front-end circuitry QQ318, and the RF transceiver circuitry QQ312, as part of a radio unit (not shown), and the communication interface QQ306 communicates with the baseband processing circuitry QQ314, which is part of a digital unit (not shown).

The antenna QQ310 may include one or more antennas, or antenna arrays, configured to send and/or receive wireless signals. The antenna QQ310 may be coupled to the radio front-end circuitry QQ318 and may be any type of antenna capable of transmitting and receiving data and/or signals wirelessly. In certain embodiments, the antenna QQ310 is separate from the network node QQ300 and connectable to the network node QQ300 through an interface or port.

The antenna QQ310, communication interface QQ306, and/or the processing circuitry QQ302 may be configured to perform any receiving operations and/or certain obtaining operations described herein as being performed by the network node. Any information, data and/or signals may be received from a UE, another network node and/or any other network equipment. Similarly, the antenna QQ310, the communication interface QQ306, and/or the processing circuitry QQ302 may be configured to perform any transmitting operations described herein as being performed by the network node. Any information, data and/or signals may be transmitted to a UE, another network node and/or any other network equipment.

The power source QQ308 provides power to the various components of network node QQ300 in a form suitable for the respective components (e.g., at a voltage and current level needed for each respective component). The power source QQ308 may further comprise, or be coupled to, power management circuitry to supply the components of the network node QQ300 with power for performing the functionality described herein. For example, the network node QQ300 may be connectable to an external power source (e.g., the power grid, an electricity outlet) via an input circuitry or interface such as an electrical cable, whereby the external power source supplies power to power circuitry of the power source QQ308. As a further example, the power source QQ308 may comprise a source of power in the form of a battery or battery pack which is connected to, or integrated in, power circuitry. The battery may provide backup power should the external power source fail.

Embodiments of the network node QQ300 may include additional components beyond those shown in FIG. 15 for providing certain aspects of the network node's functionality, including any of the functionality described herein and/or any functionality necessary to support the subject matter described herein. For example, the network node QQ300 may include user interface equipment to allow input of information into the network node QQ300 and to allow output of information from the network node QQ300. This may allow a user to perform diagnostic, maintenance, repair, and other administrative functions for the network node QQ300.

Figure 16:
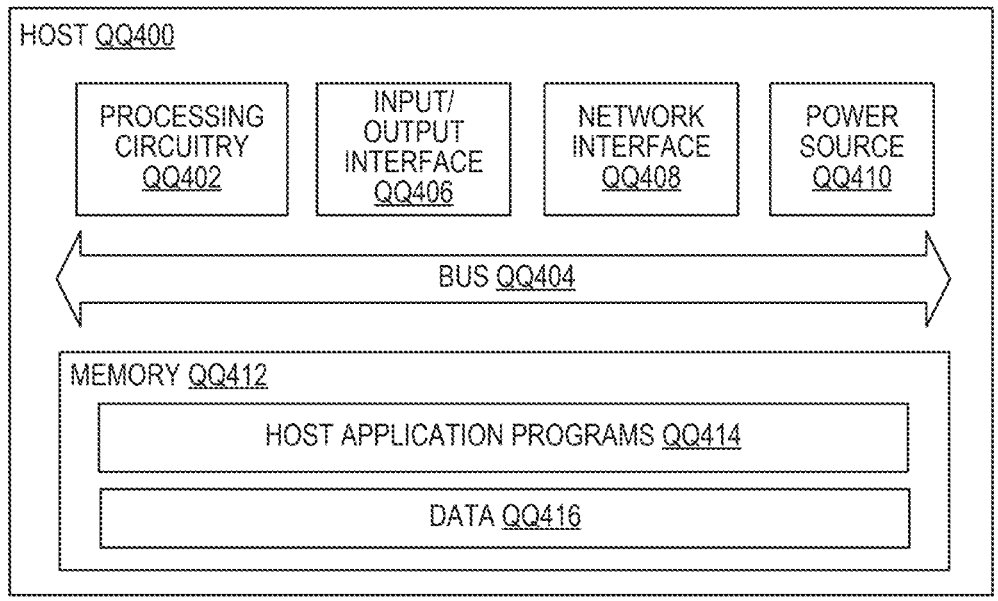
FIG. 16 is a block diagram of a host, according to an example embodiment.

FIG. 16 is a block diagram of a host QQ400, which may be an embodiment of the host QQ116 of FIG. 13, in accordance with various aspects described herein. As used herein, the host QQ400 may be or comprise various combinations hardware and/or software, including a standalone server, a blade server, a cloud-implemented server, a distributed server, a virtual machine, container, or processing resources in a server farm. The host QQ400 may provide one or more services to one or more UEs.

The host QQ400 includes processing circuitry QQ402 that is operatively coupled via a bus QQ404 to an input/output interface QQ406, a network interface QQ408, a power source QQ410, and a memory QQ412. Other components may be included in other embodiments. Features of these components may be substantially similar to those described with respect to the devices of previous figures, such as FIGS. 14 and 15, such that the descriptions thereof are generally applicable to the corresponding components of host QQ400.

The memory QQ412 may include one or more computer programs including one or more host application programs QQ414 and data QQ416, which may include user data, e.g., data generated by a UE for the host QQ400, or data generated by the host QQ400 for a UE. Embodiments of the host QQ400 may utilize only a subset, or all of the components shown. The host application programs QQ414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs QQ414 may also provide for user authentication and licensing checks and may periodically report health, routes, and content availability to a central node, such as a device in or on the edge of a core network. Accordingly, the host QQ400 may select and/or indicate a different host for over-the-top services for a UE. The host application programs QQ414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 17:
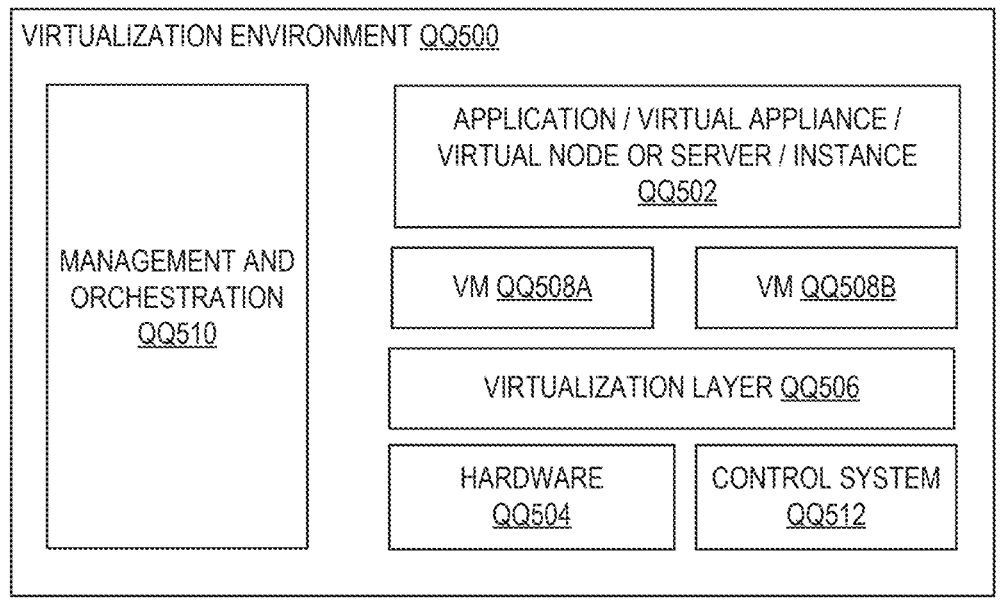
FIG. 17 is a block diagram of a virtualization environment, according to an example embodiment.

FIG. 17 is a block diagram illustrating a virtualization environment QQ500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments QQ500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications QQ502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware QQ504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers QQ506 (also referred to as hypervisors or virtual machine monitors (VMMs), provide VMs QQ508a and QQ508b (one or more of which may be generally referred to as VMs QQ508), and/or perform any of the functions, features and/or benefits described in relation with some embodiments described herein. The virtualization layer QQ506 may present a virtual operating platform that appears like networking hardware to the VMs QQ508.

The VMs QQ508 comprise virtual processing, virtual memory, virtual networking or interface and virtual storage, and may be run by a corresponding virtualization layer QQ506. Different embodiments of the instance of a virtual appliance QQ502 may be implemented on one or more of VMs QQ508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM QQ508 may be a software implementation of a physical machine that runs programs as if they were executing on a physical, non-virtualized machine. Each of the VMs QQ508, and that part of hardware QQ504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs QQ508 on top of the hardware QQ504 and corresponds to the application QQ502.

Hardware QQ504 may be implemented in a standalone network node with generic or specific components. Hardware QQ504 may implement some functions via virtualization. Alternatively, hardware QQ504 may be part of a larger cluster of hardware (e.g., such as in a data center or CPE) where many hardware nodes work together and are managed via management and orchestration QQ510, which, among others, oversees lifecycle management of applications QQ502. In some embodiments, hardware QQ504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system QQ512 which may alternatively be used for communication between hardware nodes and radio units.

Figure 18:
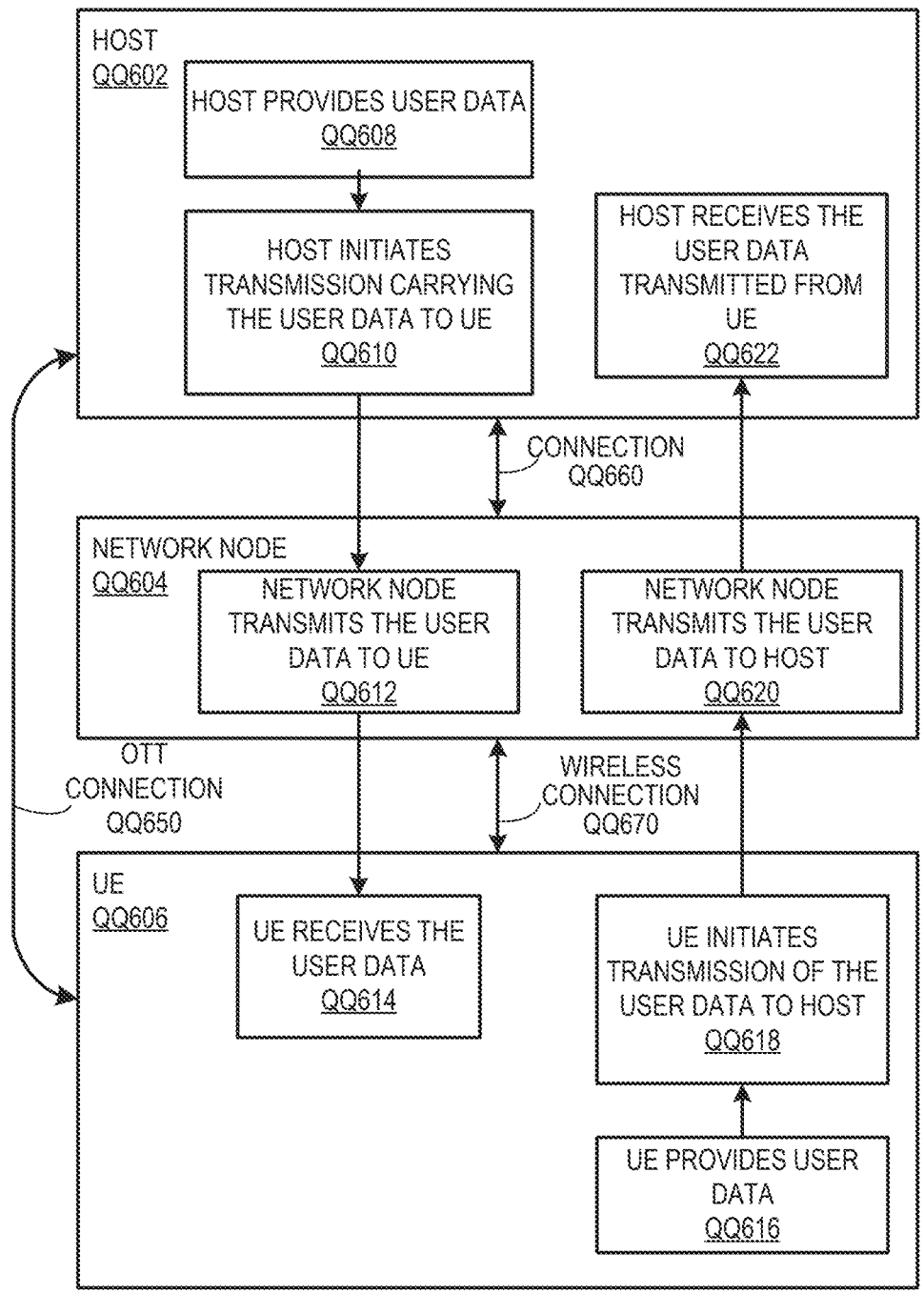
FIG. 18 is a block diagram of a host, a network node, and a UE, and communications therebetween, according to an example embodiment.

FIG. 18 shows a communication diagram of a host QQ602 communicating via a network node QQ604 with a UE QQ606 over a partially wireless connection in accordance with some embodiments. Example implementations, in accordance with various embodiments, of the UE (such as a UE QQ112a of FIG. 13 and/or UE QQ200 of FIG. 14), network node (such as network node QQ110a of FIG. 13 and/or network node QQ300 of FIG. 15), and host (such as host QQ116 of FIG. 13 and/or host QQ400 of FIG. 16) discussed in the preceding paragraphs will now be described with reference to FIG. 18.

Like host QQ400, embodiments of host QQ602 include hardware, such as a communication interface, processing circuitry, and memory. The host QQ602 also includes software, which is stored in or accessible by the host QQ602 and executable by the processing circuitry. The software includes a host application that may be operable to provide a service to a remote user, such as the UE QQ606 connecting via an over-the-top (OTT) connection QQ650 extending between the UE QQ606 and host QQ602. In providing the service to the remote user, a host application may provide user data which is transmitted using the OTT connection QQ650.

The network node QQ604 includes hardware enabling it to communicate with the host QQ602 and UE QQ606. The connection QQ660 may be direct or pass through a core network (like core network QQ106 of FIG. 13) and/or one or more other intermediate networks, such as one or more public, private, or hosted networks. For example, an intermediate network may be a backbone network or the Internet.

The UE QQ606 includes hardware and software, which is stored in or accessible by UE QQ606 and executable by the UE's processing circuitry. The software includes a client application, such as a web browser or operator-specific "app" that may be operable to provide a service to a human or non-human user via UE QQ606 with the support of the host QQ602. In the host QQ602, an executing host application may communicate with the executing client application via the OTT connection QQ650 terminating at the UE QQ606 and host QQ602. In providing the service to the user, the UE's client application may receive request data from the host's host application and provide user data in response to the request data. The OTT connection QQ650 may transfer both the request data and the user data. The UE's client application may interact with the user to generate the user data that it provides to the host application through the OTT connection QQ650.

The OTT connection QQ650 may extend via a connection QQ660 between the host QQ602 and the network node QQ604 and via a wireless connection QQ670 between the network node QQ604 and the UE QQ606 to provide the connection between the host QQ602 and the UE QQ606. The connection QQ660 and wireless connection QQ670, over which the OTT connection QQ650 may be provided, have been drawn abstractly to illustrate the communication between the host QQ602 and the UE QQ606 via the network node QQ604, without explicit reference to any intermediary devices and the precise routing of messages via these devices.

As an example of transmitting data via the OTT connection QQ650, in step QQ608, the host QQ602 provides user data, which may be performed by executing a host application. In some embodiments, the user data is associated with a particular human user interacting with the UE QQ606. In other embodiments, the user data is associated with a UE QQ606 that shares data with the host QQ602 without explicit human interaction. In step QQ610, the host QQ602 initiates a transmission carrying the user data towards the UE QQ606. The host QQ602 may initiate the transmission responsive to a request transmitted by the UE QQ606. The request may be caused by human interaction with the UE QQ606 or by operation of the client application executing on the UE QQ606. The transmission may pass via the network node QQ604, in accordance with the teachings of the embodiments described throughout this disclosure. Accordingly, in step QQ612, the network node QQ604 transmits to the UE QQ606 the user data that was carried in the transmission that the host QQ602 initiated, in accordance with the teachings of the embodiments described throughout this disclosure. In step QQ614, the UE QQ606 receives the user data carried in the transmission, which may be performed by a client application executed on the UE QQ606 associated with the host application executed by the host QQ602.

In some examples, the UE QQ606 executes a client application which provides user data to the host QQ602. The user data may be provided in reaction or response to the data received from the host QQ602. Accordingly, in step QQ616, the UE QQ606 may provide user data, which may be performed by executing the client application. In providing the user data, the client application may further consider user input received from the user via an input/output interface of the UE QQ606. Regardless of the specific manner in which the user data was provided, the UE QQ606 initiates, in step QQ618, transmission of the user data towards the host QQ602 via the network node QQ604. In step QQ620, in accordance with the teachings of the embodiments described throughout this disclosure, the network node QQ604 receives user data from the UE QQ606 and initiates transmission of the received user data towards the host QQ602.

In step QQ622, the host QQ602 receives the user data carried in the transmission initiated by the UE QQ606.

One or more of the various embodiments improve the performance of OTT services provided to the UE QQ606 using the OTT connection QQ650, in which the wireless connection QQ670 forms the last segment. More precisely, the teachings of these embodiments may improve communication latency and power consumption within the network or by the end devices, while improving reliability/availability at the application layer, e.g., for a population of devices supported by a URLLC slice of a wireless communication network. As such, these teachings provide a multiplicity of benefits, such as improving the robustness of CPSs while reducing energy consumption and improving the efficiency of network usage.

In an example scenario, factory status information may be collected and analyzed by the host QQ602. As another example, the host QQ602 may process audio and video data which may have been retrieved from a UE for use in creating maps. As another example, the host QQ602 may collect and analyze real-time data to assist in controlling vehicle congestion (e.g., controlling traffic lights). As another example, the host QQ602 may store surveillance video uploaded by a UE. As another example, the host QQ602 may store or control access to media content such as video, audio, VR or AR which it can broadcast, multicast or unicast to UEs. As other examples, the host QQ602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection QQ650 between the host QQ602 and UE QQ606, in response to variations in the measurement results. The measurement procedure and/or the network functionality for reconfiguring the OTT connection may be implemented in software and hardware of the host QQ602 and/or UE QQ606. In some embodiments, sensors (not shown) may be deployed in or in association with other devices through which the OTT connection QQ650 passes; the sensors may participate in the measurement procedure by supplying values of the monitored quantities exemplified above or supplying values of other physical quantities from which software may compute or estimate the monitored quantities. The reconfiguring of the OTT connection QQ650 may include message format, retransmission settings, preferred routing etc.; the reconfiguring need not directly alter the operation of the network node QQ604. Such procedures and functionalities may be known and practiced in the art. In certain embodiments, measurements may involve proprietary UE signaling that facilitates measurements of throughput, propagation times, latency and the like, by the host QQ602. The measurements may be implemented in that software causes messages to be transmitted, in particular empty or 'dummy' messages, using the OTT connection QQ650 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions, and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device but are enjoyed by the computing device as a whole, and/or by end users and a wireless network generally.

With the above in mind, the following groups of embodiments serve as non-limiting examples for implementation and operation of an RLP and RLO:

Group A Embodiments

1. A method performed by a network node associated with a wireless communication network, the method comprising:
   obtaining estimations of application-layer availability and reliability respect to wireless devices running one or more applications that depend on communication provided by the wireless communication network;
   determining a set of control decisions with respect to the wireless devices, based on calculating a learned reward function, wherein the learned reward function takes the estimations of application-layer availability and reliability as inputs, and wherein the control decisions control comprise transmit power settings and/or transmit diversity settings.
2. The method of embodiment 1, wherein the obtaining and determining steps are repeated on a per control cycle basis, and wherein the estimations of application-layer availability and reliability are then-current estimations in each control cycle.
3. The method of embodiment 1 or 2, wherein the transmit power settings and/or transmit diversity settings are for downlink transmissions to respective ones of the wireless devices.
4. The method of any of embodiments 1-3, wherein obtaining the estimations of application layer availability and reliability comprises deriving them from channel conditions corresponding to the wireless devices and from loading conditions of the wireless communication network, at least with respect to elements of the wireless communication network involved in providing communication to the wireless devices.
5. The method of any of embodiments 1-4, wherein obtaining the estimations of application-layer availability and reliability comprises deriving them for respective ones of the wireless devices, based on statistics collected for transmissions to or from respective ones of the wireless device over a time interval.
6. The method of any of embodiments 1-5, wherein the wireless devices comprise a Cyber-Physical System (CPS) or are otherwise used to provide communication for respective entities of the CPS.
7. The method of any of embodiments 1-6, wherein the wireless devices are served by a network slice provided via the wireless communication network, and wherein one or more Quality-of-Service (QoS) parameters of the network slice are configured for Ultra Reliable Low Latency Communication (URLLC), and wherein the wireless devices are managed as a defined population of users being served via the network slice.
8. The method of any of embodiments 1-7, wherein the wireless devices comprise an industrial control network comprising one or more sensors and one or more actuators communicatively linked to the one or more sensors via the wireless communication network.
9. The method any of embodiments 1-8, further comprising carrying out reinforcement learning to learn the reward function.
10. The method of embodiment 9, wherein a Reinforcement Learning Planner (RLP) carries out the reinforcement learning on a recurring or continuing basis, and wherein a Reinforcement Learning Orchestrator (RLO) carries out the obtaining and determining steps on a recurring basis.
11. The method of embodiment 10, wherein a learning cycle of the RLP is slower than a control cycle of the RLP, each control cycle of the RLP comprising carrying out the obtaining and determining steps.
12. The method of embodiment 10 or 11, wherein the RLP interfaces with an Operations & Maintenance (OAM) function of the wireless communication network, and wherein the method includes requesting higher or lower allocations of transmission power or radiofrequency bandwidth for use in supporting communication with the wireless devices, in dependence on evaluating the estimations of application-layer availability and reliability with respect to defined Key Performance Indicators (KPIs).
13. The method of any of embodiments 1-12, wherein the method further comprises signaling the control decisions.
14. The method of embodiment 13, wherein signaling the control decisions comprises sending control signaling towards one or more radio access nodes of the wireless communication network, the one or more radio access nodes being serving radio access nodes with respect to the wireless devices.

15. The method of any of the previous embodiments, further comprising:

obtaining user data; and forwarding the user data to a host or a user equipment.

Group B Embodiments

16. A network node comprising:

processing circuitry configured to perform any of the steps of any of the Group A embodiments;

power supply circuitry configured to supply power to the processing circuitry.

17. The network node of embodiment 16, wherein the network node comprises one or more computer servers having virtualized or non-virtualized processing and communication resources configured for carrying out any of the Group A embodiments.

18. A network node comprising:

a computer processor; and memory containing program instructions that, when executed by the computer processor, configure the computer processor to carry out any of the Group A embodiments.

19. A network node comprising:

communication interface circuitry; and processing circuitry operatively associated with the communication interface circuitry and configured to carry out any of the Group A embodiments.

20. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry configured to receive the user data from the host, via the cellular network.

21. The host of the previous embodiment, wherein the cellular network further includes a network node configured to communicate with the UE to transmit the user data to the UE from the host.

22. The host of the previous 2 embodiments, wherein:

the processing circuitry of the host is configured to execute a host application, thereby providing the user data; and the host application is configured to interact with a client application executing on the UE, the client application being associated with the host application.

23. A method implemented by a host operating in a communication system that further includes a network node and a user equipment (UE), the method comprising:

providing user data for the UE; and initiating a transmission carrying the user data to the UE via a cellular network comprising the network node, wherein the UE is configured to receive the user data from the host, via the cellular network.

24. The method of the previous embodiment, further comprising:

at the host, executing a host application associated with a client application executing on the UE to receive the user data from the UE.

25. The method of the previous embodiment, further comprising:

at the host, transmitting input data to the client application executing on the UE, the input data being provided by executing the host application, wherein the user data is provided by the client application in response to the input data from the host application.

26. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to transmit the user data to the host.

27. The host of the previous embodiment, wherein the cellular network further includes a network node configured to communicate with the UE to transmit the user data from the UE to the host.

28. The host of the previous 2 embodiments, wherein:

the processing circuitry of the host is configured to execute a host application, thereby providing the user data; and the host application is configured to interact with a client application executing on the UE, the client application being associated with the host application.

29. A method implemented by a host configured to operate in a communication system that further includes a network node and a user equipment (UE), the method comprising:

at the host, receiving user data transmitted to the host via the network node by the UE, wherein the UE is configured to transmit the user data to the host.

30. The method of the previous embodiment, further comprising:

at the host, executing a host application associated with a client application executing on the UE to receive the user data from the UE.

31. The method of the previous embodiment, further comprising:

at the host, transmitting input data to the client application executing on the UE, the input data being provided by executing the host application, wherein the user data is provided by the client application in response to the input data from the host application.

32. A host configured to operate in a communication system to provide an over-the-top (OTT) service, the host comprising:

processing circuitry configured to provide user data; and a network interface configured to initiate transmission of the user data to a network node in a cellular network for transmission to a user equipment (UE), the network node having a communication interface and processing circuitry, the processing circuitry of the network node configured to transmit the user data from the host to the UE.

33. The host of the previous embodiment, wherein:

the processing circuitry of the host is configured to execute a host application that provides the user data; and the UE comprises processing circuitry configured to execute a client application associated with the host application to receive the transmission of user data from the host.

34. A method implemented in a host configured to operate in a communication system that further includes a network node and a user equipment (UE), the method comprising:

providing user data for the UE; and initiating a transmission carrying the user data to the UE via a cellular network comprising the network node, wherein the network node is configured to transmit the user data from the host to the UE.

35. The method of the previous embodiment, further comprising, at the network node, transmitting the user data provided by the host for the UE.

36. The method of any of the previous 2 embodiments, wherein the user data is provided at the host by executing a host application that interacts with a client application executing on the UE, the client application being associated with the host application.

37. A communication system configured to provide an over-the-top service, the communication system comprising:

a host comprising:

processing circuitry configured to provide user data for a user equipment (UE), the user data being associated with the over-the-top service; and a network interface configured to initiate transmission of the user data toward a cellular network node for transmission to the UE, the cellular network node having a communication interface and processing circuitry, the processing circuitry of the network node configured to transmit the user data from the host to the UE.

38. The communication system of the previous embodiment, further comprising:

the network node; and/or the user equipment.

39. A host configured to operate in a communication system to provide an over-the-top (OTT) service, the host comprising:

processing circuitry configured to initiate receipt of user data; and a network interface configured to receive the user data from a network node in a cellular network, the network node having a communication interface and processing circuitry, the processing circuitry of the network node configured to receive the user data from a user equipment (UE) for the host.

40. The host of the previous 2 embodiments, wherein:

the processing circuitry of the host is configured to execute a host application, thereby providing the user data; and the host application is configured to interact with a client application executing on the UE, the client application being associated with the host application.

41. The host of the any of the previous 2 embodiments, wherein the initiating receipt of the user data comprises requesting the user data.

42. A method implemented by a host configured to operate in a communication system that further includes a network node and a user equipment (UE), the method comprising:

at the host, initiating receipt of user data from the UE, the user data originating from a transmission which the network node has received from the UE, wherein the network node performs any of the steps of any of the Group B embodiments to receive the user data from the UE for the host.

43. The method of the previous embodiment, further comprising at the network node, transmitting the received user data to the host.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a network node of a wireless communication network, the method comprising, in each control cycle in a continuing succession of control cycles, performing control operations including:

obtaining estimates of application-layer availability and reliability for respective devices among a population of devices collectively operating as a cyber-physical system, each device executing one or more respective applications that run in dependence on cyber-physical system communications exchanged over a respective wireless link provided by the wireless communication network, such that the estimates of application-layer availability and reliability depend on channel conditions of the respective wireless links and loading conditions in the wireless communication network, bearing on delivery of the cyber-physical system communications;

determining a set of control decisions via a learned reward function that takes the estimates of application-layer availability and reliability as inputs and is trained to determine the set of control decisions as transmit power and transmit diversity settings for transmitting on the respective wireless links, for maximization of application-layer availability and reliability in the cyber-physical system, subject to transmit power and bandwidth allocations of the wireless communication network for supporting the cyber-physical system; and sending signaling indicating the transmit power and transmit diversity settings.

2. The method according to claim 1, wherein one or more radio access nodes of the wireless communication network each support one or more of the respective wireless links, and wherein sending the signaling comprises sending, to each such radio access node, particular signaling indicating the transmit power and transmit diversity settings for the one or more respective wireless links supported by the radio access node.

3. The method according to claim 1, wherein the transmit power and transmit diversity settings are downlink transmit power and transmit diversity settings.

4. The method according to claim 1, wherein obtaining the estimates of application-layer availability and reliability comprises deriving them from the channel conditions and the loading conditions.

5. The method according to claim 1, wherein obtaining the estimations of application-layer availability and reliability comprises deriving them for the respective devices, based on statistics collected over a time interval for transmissions to or from each of the respective devices.

6. The method according to claim 1, wherein the respective devices are served by a network slice provided via the wireless communication network, and wherein one or more Quality-of-Service (QoS) parameters of the network slice are configured for Ultra Reliable Low Latency Communication (URLLC), and wherein the transmit power and bandwidth allocations are power and bandwidth limitations applicable to the network slice.

7. The method according to claim 1, wherein the cyber-physical system comprises an industrial control network and the population of devices comprises a mix of sensors and actuators communicatively linked together by the wireless communication network.

8. The method according to claim 1, further comprising carrying out reinforcement learning to form the learned reward function.

9. The method according to claim 8, wherein a Reinforcement Learning Planner (RLP) carries out the reinforcement learning on a recurring or continuing basis, and wherein a Reinforcement Learning Orchestrator (RLO) performs the control operations in each control cycle.

10. The method according to claim 9, wherein a learning cycle of the RLP is slower than the control cycle of the RLP.

11. The method according to claim 9, wherein the RLP performs hyperparameter tuning of the learned reward function, over one or more learning cycles.

12. The method according to claim 1, further comprising determining statistics from the estimates of application-layer availability and reliability taken over multiple control cycles, comparing the statistics with corresponding Key Performance Indicators (KPIs) reflecting system-level availability and reliability goals for the cyber-physical system, and, in dependence on the comparing, requesting, from an Operations and Maintenance (OAM) function of the wireless communication network, changes to the transmit power and bandwidth allocations.

13. One or more nodes configured for operation with respect to a wireless communication network that provides wireless links for interconnecting devices among a population of devices collectively comprising a cyber-physical system, the one or more nodes comprising:
communication interface circuitry; and
processing circuitry that is configured to perform control operations in each control cycle in a continuing succession of control cycles, the processing circuitry being particularly configured to:
obtain estimates of application-layer availability and reliability for respective devices among the population of devices, each device executing one or more respective applications that run in dependence on cyber-physical system communications exchanged over a respective wireless link provided by the wireless communication network, such that the estimates of application-layer availability and reliability depend on channel conditions of the respective wireless links and loading conditions in the wireless communication network, bearing on delivery of the cyber-physical system communications;
determine a set of control decisions via a learned reward function that takes the estimates of application-layer availability and reliability as inputs and is trained to determine the set of control decisions as transmit power and transmit diversity settings for transmitting on the respective wireless links, for maximization of application-layer availability and reliability in the cyber-physical system, subject to transmit power and bandwidth allocations of the wireless communication network for supporting the cyber-physical system; and
send, via the communication interface circuitry, signaling indicating the transmit power and transmit diversity settings.

14. The one or more nodes according to claim 13, wherein one or more radio access nodes of the wireless communication network each support one or more of the respective wireless links, and wherein the processing circuitry is configured to send the signaling by sending particular signaling to each such radio access node, indicating the transmit power and transmit diversity settings for the one or more respective wireless links supported by the radio access node.

15. The one or more nodes according to claim 13, wherein the transmit power and transmit diversity settings are downlink transmit power and transmit diversity settings.

16. The one or more nodes according to claim 13, wherein the processing circuitry is configured to obtain the estimates of application-layer availability and reliability by deriving them from the channel conditions and the loading conditions.

17. The one or more nodes according to claim 13, wherein the processing circuitry is configured to obtain the estimations of application-layer availability and reliability by deriving them for the respective devices, based on statistics collected over a time interval for transmissions to or from each of the respective devices.

18. The one or more nodes according to claim 13, wherein the respective devices are served by a network slice provided via the wireless communication network, and wherein one or more Quality-of-Service (QoS) parameters of the network slice are configured for Ultra Reliable Low Latency Communication (URLLC), and wherein the transmit power and bandwidth allocations are power and bandwidth limitations applicable to the network slice.

19. The one or more nodes according to claim 13, wherein the cyber-physical system comprises an industrial control network and the population of devices comprises a mix of sensors and actuators communicatively linked together by the wireless communication network.

20. An apparatus configured for operation with respect to a wireless communication network that provides wireless links for interconnecting devices among a population of devices collectively comprising a cyber-physical system, the apparatus comprising:
communication interface circuitry;
a computer processor; and
memory storing computer program instructions that, when executed by the computer processor, cause the computer processor to:
obtain estimates of application-layer availability and reliability for respective devices among the population of devices, each device executing one or more respective applications that run in dependence on cyber-physical system communications exchanged over a respective wireless link provided by the wireless communication network, such that the estimates of application-layer availability and reliability depend on channel conditions of the respective wireless links and loading conditions in the wireless communication network, bearing on delivery of the cyber-physical system communications;
determine a set of control decisions via a learned reward function that takes the estimates of application-layer availability and reliability as inputs and is trained to determine the set of control decisions as transmit power and transmit diversity settings for transmitting on the respective wireless links, for maximization of application-layer availability and reliability in the cyber-physical system, subject to transmit power and bandwidth allocations of the wireless communication network for supporting the cyber-physical system; and send, via the communication interface circuitry, signaling indicating the transmit power and transmit diversity settings.

\* \* \* \* \*